(12) United States Patent
Robertson et al.

(10) Patent No.: US 12,159,498 B2
(45) Date of Patent: Dec. 3, 2024

(54) SYSTEMS AND METHODS FOR CREATING DUPLICATE KEYS AND PAIRING WITH VEHICLES

(71) Applicant: iKeyless, LLC, Louisville, KY (US)

(72) Inventors: Douglas Robertson, Crestwood, KY (US); Adam Pizer, Louisville, KY (US); David Horsfall, Eldwick (GB); Ian Simon Smith, Willenhall (GB)

(73) Assignee: iKeyless, LLC, Louisville, KY (US)

( * ) Notice: Subject to any disclaimer, the term of this patent is extended or adjusted under 35 U.S.C. 154(b) by 442 days.

(21) Appl. No.: 17/447,689

(22) Filed: Sep. 14, 2021

(65) Prior Publication Data

US 2022/0139138 A1    May 5, 2022

Related U.S. Application Data

(63) Continuation-in-part of application No. 17/169,252, filed on Feb. 5, 2021.

(60) Provisional application No. 62/970,661, filed on Feb. 5, 2020.

(51) Int. Cl.
*G07C 9/00* (2020.01)
*B23Q 35/40* (2006.01)
*G06F 16/955* (2019.01)
*G07C 9/38* (2020.01)

(52) U.S. Cl.
CPC ......... *G07C 9/00857* (2013.01); *B23Q 35/40* (2013.01); *G06F 16/9558* (2019.01); *G07C 9/38* (2020.01)

(58) Field of Classification Search
CPC ............ G07C 9/00857; G07C 16/9558; G07C 9/38; B23Q 35/40
USPC ......... 340/5.25, 5.65, 5.23, 5.22, 5.6, 10.51, 340/12.23, 426.35, 12.28, 426.14
See application file for complete search history.

(56) References Cited

U.S. PATENT DOCUMENTS

| | | |
|---|---|---|
| 2,582,012 A | 1/1952 | Currier |
| 3,323,420 A | 6/1967 | Roxburgh |
| 3,413,892 A | 12/1968 | Casey |
| 3,442,174 A | 5/1969 | Weiner et al. |
| 3,796,130 A | 3/1974 | Gartner |
| 4,889,391 A | 12/1989 | Cimino et al. |
| 4,899,391 A | 2/1990 | Cimino et al. |
| 5,127,532 A | 7/1992 | Cimino et al. |

(Continued)

FOREIGN PATENT DOCUMENTS

| | | | |
|---|---|---|---|
| DE | 102004006734 B4 * | 10/2020 | ......... B60R 25/2081 |
| EP | 0 492 372 A2 | 7/1992 | |

(Continued)

*Primary Examiner* — Tri T Ton
*Assistant Examiner* — Jarreas Underwood
(74) *Attorney, Agent, or Firm* — Gray Ice Higdon

(57) ABSTRACT

A kiosk-based system provides enhanced processes for replicating or copying keys including automotive keys and including transponder keys requiring programming. A set of user interfaces guides users through master key identifying, key blank selecting, master key scanning and duplicate key cutting processes as well as programming programmable keys. The invention provides a Quick Reference redundancy to add an additional layer of accuracy to avoid errors in selecting key blanks and in cutting selected key blanks. The system creates a copy or duplicate of a master key based on a captured image of the master key and stored key data.

34 Claims, 27 Drawing Sheets

(56) References Cited

U.S. PATENT DOCUMENTS

| | | |
|---|---|---|
| 5,677,682 A | 10/1997 | Thorsen |
| 5,771,176 A | 6/1998 | Froehlich |
| 5,807,042 A | 9/1998 | Almblad et al. |
| 5,908,273 A | 6/1999 | Titus |
| 6,065,911 A * | 5/2000 | Almblad ................. G06F 18/00 409/83 |
| 6,152,662 A | 11/2000 | Titus et al. |
| 6,175,638 B1 | 1/2001 | Yanovsky |
| 6,185,311 B1 | 2/2001 | Yanovsky et al. |
| 6,406,227 B1 | 6/2002 | Titus et al. |
| 6,449,381 B1 | 9/2002 | Yanovsky et al. |
| 6,543,972 B1 | 4/2003 | Cimino |
| 6,588,995 B2 | 7/2003 | Wills et al. |
| 6,647,308 B1 | 11/2003 | Prejean |
| 6,836,553 B2 | 12/2004 | Campbell et al. |
| 6,839,451 B2 | 1/2005 | Campbell et al. |
| 6,895,100 B1 | 5/2005 | Pacenzia et al. |
| 7,768,377 B2 | 8/2010 | Brey |
| 7,890,878 B2 | 2/2011 | Bass et al. |
| 7,891,919 B2 | 2/2011 | Bass et al. |
| 8,128,322 B2 | 3/2012 | Bass et al. |
| 8,287,215 B2 | 10/2012 | Freeman et al. |
| 8,532,809 B2 | 9/2013 | Freeman |
| 8,626,331 B2 | 1/2014 | Marsh et al. |
| 8,634,655 B2 | 1/2014 | Thompson et al. |
| 8,634,665 B2 | 1/2014 | Fukuhara et al. |
| 8,634,951 B2 | 1/2014 | Freeman |
| 8,644,619 B2 | 2/2014 | Thompson et al. |
| 8,682,468 B2 | 3/2014 | Marsh et al. |
| 8,965,794 B2 | 2/2015 | Bass et al. |
| 8,979,446 B2 | 3/2015 | Freeman |
| 8,985,918 B2 | 3/2015 | Bass et al. |
| 8,992,145 B1 | 3/2015 | Mueller et al. |
| 9,101,990 B2 | 8/2015 | Mutch et al. |
| 9,199,318 B2 | 12/2015 | Freeman et al. |
| 9,269,136 B2 | 2/2016 | Day et al. |
| 9,308,590 B2 | 4/2016 | Bass et al. |
| 9,323,237 B2 | 4/2016 | Freeman |
| 9,323,884 B2 * | 4/2016 | Overman ................. G05B 15/02 |
| 9,468,982 B1 | 10/2016 | Mueller et al. |
| 9,514,385 B2 | 12/2016 | Thompson et al. |
| 9,556,649 B1 | 1/2017 | Mueller et al. |
| 9,558,236 B1 | 1/2017 | Hagen et al. |
| 9,563,885 B2 | 2/2017 | Marsh et al. |
| 9,582,734 B2 | 2/2017 | Thompson et al. |
| 9,656,332 B2 | 5/2017 | Bass et al. |
| 9,682,432 B2 | 6/2017 | Mutch et al. |
| 9,687,920 B2 | 6/2017 | Bass et al. |
| 9,808,900 B2 | 11/2017 | Gardner et al. |
| 9,815,126 B2 | 11/2017 | Bass et al. |
| 9,818,041 B2 | 11/2017 | Mutch et al. |
| 9,895,753 B2 | 2/2018 | Huss et al. |
| 9,914,179 B2 | 3/2018 | Freeman et al. |
| 9,925,601 B2 | 3/2018 | Mutch et al. |
| 9,934,448 B2 | 4/2018 | Thompson et al. |
| 9,950,375 B2 | 4/2018 | Burkett et al. |
| 9,963,908 B2 | 5/2018 | Bass et al. |
| 9,987,715 B2 | 6/2018 | Gardner et al. |
| 10,010,949 B2 | 7/2018 | Hagen et al. |
| 10,013,833 B2 | 7/2018 | Blalock et al. |
| 10,018,982 B2 | 7/2018 | Chambers et al. |
| 10,068,401 B1 | 9/2018 | Blalock et al. |
| 10,252,392 B2 | 4/2019 | Gardner et al. |
| 10,421,133 B2 | 9/2019 | Bass et al. |
| 10,480,214 B2 | 11/2019 | Bass et al. |
| 10,482,439 B2 | 11/2019 | Freeman |
| 2001/0033781 A1 * | 10/2001 | Wills ................. B23C 3/35 269/142 |
| 2009/0228795 A1 | 9/2009 | Bass |
| 2011/0297691 A1 | 12/2011 | Freeman |
| 2011/0301738 A1 * | 12/2011 | Freeman ................. G07F 17/26 700/106 |
| 2012/0243957 A1 | 9/2012 | Drake et al. |
| 2013/0138243 A1 | 5/2013 | Freeman |
| 2013/0170693 A1 | 7/2013 | Marsh |
| 2013/0173044 A1 | 7/2013 | Marsh |
| 2013/0204423 A1 * | 8/2013 | Overman ................. G05B 15/02 700/117 |
| 2013/0331976 A1 | 12/2013 | Freeman |
| 2014/0377027 A1 | 12/2014 | Burkett et al. |
| 2015/0050094 A1 | 2/2015 | Gerlings |
| 2016/0114412 A1 | 4/2016 | Bosch |
| 2016/0321632 A1 | 11/2016 | Moore et al. |
| 2016/0375503 A1 | 12/2016 | Bass et al. |
| 2017/0039447 A1 | 2/2017 | Mutch et al. |
| 2017/0193327 A1 * | 7/2017 | Thompson ............. G01B 11/22 |
| 2017/0225242 A1 * | 8/2017 | Spangler ................. B23C 3/35 |
| 2018/0046881 A1 | 2/2018 | Mutch et al. |
| 2018/0065226 A1 | 3/2018 | Gardner et al. |
| 2018/0079014 A1 | 3/2018 | Marsh |
| 2018/0079015 A1 | 3/2018 | Marsh et al. |
| 2018/0154459 A1 | 6/2018 | Freeman |
| 2018/0204089 A1 | 7/2018 | Thompson et al. |
| 2018/0207733 A1 | 7/2018 | Mutch et al. |
| 2018/0232983 A1 | 8/2018 | Blalock et al. |
| 2018/0250785 A1 | 9/2018 | Gardner et al. |
| 2018/0264561 A1 | 9/2018 | Schmidt |
| 2018/0335520 A1 | 11/2018 | Tofte |
| 2020/0002975 A1 * | 1/2020 | Grice ................. G06F 18/00 |
| 2020/0013241 A1 * | 1/2020 | Johnson ................. B60R 25/248 |

FOREIGN PATENT DOCUMENTS

| | | |
|---|---|---|
| EP | 3 412 389 A1 | 12/2018 |
| EP | 3 412 405 A1 | 12/2018 |
| EP | 3 412 406 A1 | 12/2018 |
| EP | 3 466 577 A1 | 4/2019 |
| EP | 3967970 A1 | 3/2022 |
| GB | 952978 A | 3/1964 |
| GB | 2 293 341 A | 3/1996 |
| GB | 2563224 A | 12/2018 |
| GB | 2564556 A | 1/2019 |
| GB | 2564557 A | 1/2019 |
| GB | 2567194 A | 4/2019 |
| WO | WO 99/55482 A1 | 11/1999 |
| WO | WO 2008/066857 A2 | 6/2008 |
| WO | WO 2011/153473 A2 | 12/2011 |
| WO | WO-2012170321 A2 * | 12/2012 ............. B23C 3/35 |
| WO | WO 2012/103774 A1 | 7/2013 |

* cited by examiner

Open the cut door and place the key blank in the red spring. If the key has buttons they should face up Visual Aid – Cut/Scan Door Indicators Retrieve CDCL-E0GK10DL, Drawer D, Bin 12
(Quick Reference 30)

Open the cut door and place the key blank in the red spring. If the key has buttons they should face up Visual Aid – Key Blank ID and Locator Indicators Retrieve CDCL-E0GK10DL, Drawer D, Bin 12
(Quick Reference 30)

Pairing Method: Programmer

Visual Aid – Key Programmer and App Tool for use in programming key

For example, may show:
"Please use the EZ Installer Programmer" or "Select the Smart Bbox Mini." The displayed information may include photo, part identifier (e.g., NIEP-N00XX), Storage bin location (e.g., B13), Dial Position for setting the Programmer, and option to print instructions Select the Smart Box Mini from Drawer A.
Follow instructions on programming tool.

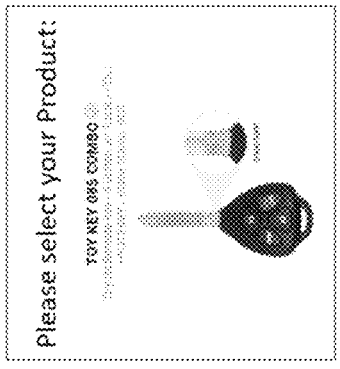
FIG.29
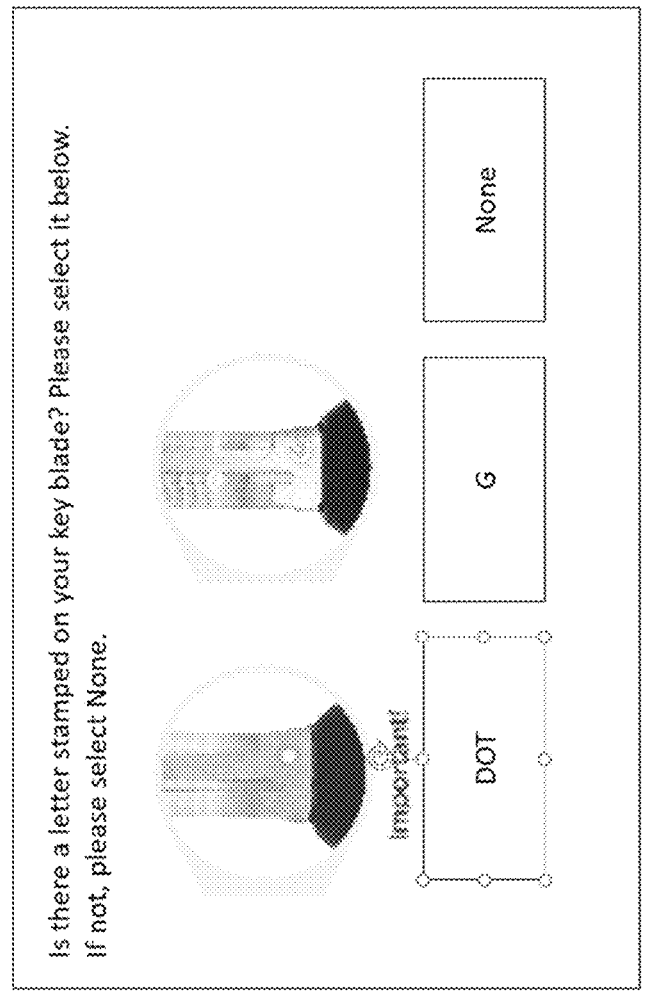
FIG.28
FIG.30

Screen
(if G):

Please select your Product:

TOY KEY 800

Screen
(if DOT):

Please select your Product:

TOY KEY 085.25 COMBO

Screen
(if None):

Does your key list a 'FCC ID' on the back? If yes, please select it. If no, please select None HYQ12BBY    None Please select your Product:

TOY KEY 801

Please select your Product:

TOY KEY 085.25 COMBO

FIG.31

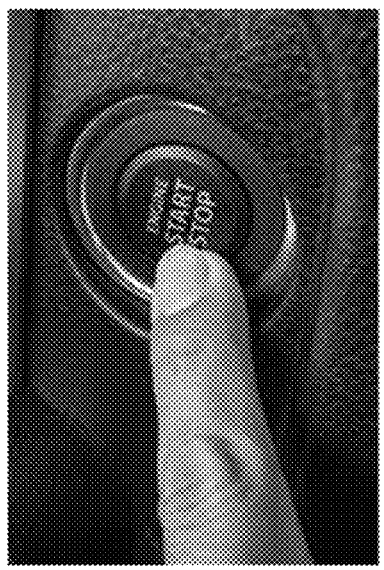
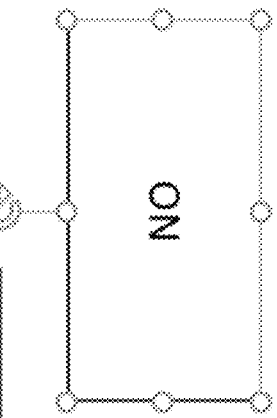
FIG.32

IF YES:
Screen: Does your key list a 'FCC ID' on the back? If yes, please select it. If no, please select None.
HYQ14AAB
None
Screen:
Please select your Product:
TOY 130 SMARTKEY
Screen:
Please select your Product:
TOY KEY 350
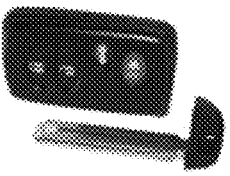
FIG.33

If NO:

Screen:

Is there a letter stamped on your key blade? Please select it below. If not, please select None.

Important!

| DOT | G | None |

FIG.34

SYSTEMS AND METHODS FOR CREATING DUPLICATE KEYS AND PAIRING WITH VEHICLES

CROSS-REFERENCE TO RELATED APPLICATION

The present invention claims the benefit of priority to U.S. Prov. Pat. App. No. 62/970,661, entitled SYSTEMS AND METHODS FOR CREATING DUPLICATE KEYS, Robertson et al., filed Feb. 5, 2020 (113083.017PRV), and to U.S. Nonprovisional patent application Ser. No. 17/169,252, entitled SYSTEMS AND METHODS FOR CREATING DUPLICATE KEYS, Robertson et al., filed Feb. 5, 2021 (113083.017US1), both of which are incorporated by reference herein in the entirety.

FIELD OF INVENTION

The present invention generally relates to the field of replicating or copying keys. More specifically, the present invention relates to creating a copy of a master key based on a set of information captured from the master key. The present invention identifies a set of information derived from information input via a user interface and the master key to provide for the cutting of a duplicate keyblade copy and for pairing a key with an intended vehicle for operation.

BACKGROUND OF THE INVENTION

Remote Access systems for consumer vehicles have become a popular, if not essential, feature of most vehicles sold today. Nearly every vehicle on the market for the past several years has included some form of keyless entry as either a standard feature or add-on option. Consumers with older vehicles without remote access systems have been able to retrofit their vehicles with aftermarket systems.

The technologies behind these systems have evolved rapidly with remote systems moving from low security fixed codes with simple transmission schemes to high security encrypted rolling codes with advanced transmission protocols. Developers of these systems, both original equipment manufacturer ("OEM") and aftermarket, have been constantly refining and improving their offerings to take advantage of improvements in technology. Over time, the numerous designs and platforms, coupled with rapidly changing security technologies, have resulted in a great variety of remote devices and systems that are almost universally incompatible across vehicle brands or makes and even between different year and models of vehicles.

In addition to the programming tools and software for pairing modern car keys, remotes, remote access devices, or key fobs with a vehicle, locksmiths must provide keyblades that come in many types and shapes depending on the manufacturer's requirements for the ignition cylinder. Modern blades are typically milled as opposed to traditional grinding wheel approaches. These special cutting tools are also very expensive.

Problems exist in the identification of the bitting patterns and other information related to the type, shape, contour, and other characteristics related to the keyblade for a master key to be copied. Specifically, issues exist in properly identifying the exact shape of the keyblade, compensating for wear or damage to the keyblade, verifying that the keyblade being examined matches a key blank to be copied, verifying that the bitting pattern observed or determined from a master key is a valid pattern, and in cutting a key copy from a blank based on information gathered from a master key. Such issues include issues with the positioning of the master key relative to an information gathering system, such as a camera, and may include parallax, shadows, foreshortening, and blurriness of a captured image.

Specifically, with keys such as residential house keys, which normally have a relatively flat profile, the house key may be placed flat on a surface when it is to be scanned or imaged to capture information related to the key. A process such as single laser scanning may be used to capture the key information for the house key. This process is typically efficient and accurate when the position and orientation of the key to be captured are known and can be pre-programmed or designed for in a key duplication system. For example, scaling and laser positioning for a laser-based image capture device, or focus and zoom distance for a (charge couple device) CCD-type photo sensor image capture device having a lens, can be calibrated to an exact or known distance between a laser or camera and a scanning surface, which may be a glass surface such as a glass plate. This process typically provides accuracy for sending the laser or camera to an optimum position to generate a (three-dimensional) 3D profile, cut depth and/or bitting information, and decoding measurements related to the house key being captured by the image capturing apparatus of the key copying device.

However, for keys such as vehicle keys, car keys, keyblades with an attached remote or key fob, or novelty or designer keys, the exact distance and positioning of the keyblade relative to the scanning surface and to the image capture device cannot accurately be known or determined with existing systems. Inaccurate, incorrect or unknowable information introduces errors or discrepancies into the information captured by the image capture device and as determined by the key duplication system resulting in a point of failure.

What is needed is a system and method for effectively and accurately capturing information from a master key to be copied. What is needed is a system that can correct for issues typically present in the capture of information related to a master key that is not ideally positioned relative to an image capture device.

What is needed is a key cutting system providing a user interface and system of components configured to allow unsupervised or semi-supervised key cutting and vehicle pairing operation.

SUMMARY OF THE INVENTION

The present invention a user interface and system of components configured to allow unsupervised or semi-supervised key cutting and vehicle pairing operation such as a kiosk or stand-alone key cutting machine. The invention provides a machine capable of a wider range of commercial deployment, e.g., auto parts stores, big box hardware stores, grocery stores, and others. The system includes an interactive display with a set of user interfaces to assist a user in entering key identifying information, such as make, model, and year ("MMY"). The system provides a set of selectable key products and programming tools for pairing an automotive key with an intended vehicle for operation.

Once a key is properly identified, the system presents user interfaces to assist a user in properly placing the master key to be copied in a key copying process ("duplication") to insure accurate capturing of data from the master key and for decoding the information captured from the master key. This process enables the system to determine a set of characteristics, such as keyblade type, cut depth, bitting information, and key decoding measurements for the master key to be used in the cutting of a duplicate key from a key blank. The system provides a set of programming tools and related vehicle interface tools to allow a user to effectively pair a new key with a target vehicle. The system provides user interfaces to facilitate accurate key identification, selection and cutting and pairing. The system includes residential key cutting capabilities to allow a user to identify and select an appropriate residential keyblade type for cutting. The system provides a stand-alone system to permit users to handle key selection and cutting in an efficient and effective manner avoiding the need for highly trained professional assistance, increasing accuracy in kiosk or stand-alone systems of the past, expanding the scope of key cutting services offered by kiosk or stand-alone systems of the past, and reduces the cost associated with key cutting products and services.

Relative to the capturing and decoding of information related to typical residential keys, the capturing and decoding of information related to vehicle keys, car keys, keyblades with an attached remote or key fob, or novelty or designer keys (generally referred to herein as "vehicle keys") introduces a number of problems, among other improvements and solutions, that are solved by the system and method of the present invention. With vehicle keys, when the keyblade is positioned on a scanning surface, such as a scanning glass, for an image of and information related to the keyblade to be captured by an image capture device, such as a camera, laser, or camera and laser imaging system, the size, shape, contours and/or dimensions of the vehicle key or its remote or fob may prevent the key from being optimally positioned on the scanning surface. The present invention provides user interfaces for stepping a user through the key cutting process to insure accurate selection of blank keyblades, accurate positioning of master keyblades for imaging, and proper placement of key blanks for cutting to achieve a high level of successful key cutting and avoid product waste, time and frustration associated with ineffectively cut keys that do not operate a vehicle as intended.

Replacement or duplicate keys may directly replicate or emulate all features of the vehicle OEM key or may include additional features unique to a universal remote head key ("URHK"). A URHK is a universal key that combines a keyfob/keyless entry system, transponder, and keyblade into a single unit that may be programmed and configured to operate with a wide range of vehicle makes and models. URHKs and the systems and methods for programming them are described in METHOD AND APPARATUS FOR IMPLEMENTING MULTI-VENDOR ROLLING CODE KEYLESS ENTRY SYSTEMS, U.S. patent application Ser. No. 14/165,922, filed Jan. 28, 2014 (113083.001US1)(patented as U.S. Pat. No. 10,115,255), Johnson et al., which is incorporated by reference herein in its entirety. Methods and systems for dongle-based key pairing and programming are described in U.S. patent application Ser. No. 16/947,892, entitled SYSTEM AND METHOD FOR PAIRING A KEY WITH A VEHICLE VIA A VEHICLE COMMUNICATIONS PORT BY A DONGLE, Johnson et al., filed Aug. 23, 2020 (113083.010US2), which is incorporated herein by reference in its entirety. Replacement or duplicate keys and related information may be stored in a "key bank" such as described in U.S. patent application Ser. No. 16/153,602, filed Oct. 5, 2018 (113083.009US1), and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), which is incorporated herein by reference in its entirety. Another system for processing information related to master keys for duplicating is described in U.S. patent application Ser. No. 16/898,251, entitled SYSTEMS AND METHODS FOR CREATING REPLACEMENT VEHICLE KEYS, Determan et al., filed Jun. 10, 2020 (113083.014US1), which is incorporated by reference herein in its entirety. An additional system for providing key duplication processing information related to master keys for duplicating is described in U.S. Provisional Patent App. 62/970,419, entitled SYSTEMS AND METHODS FOR CREATING REPLACEMENT VEHICLE KEYS, Determan et al., filed Feb. 5, 2020 (113083.018PRV), which is incorporated by reference herein in its entirety.

Retail and commercial machines for the copying of residential keys may include many automatic or semi-automatic systems. Several such systems and methods are described in at least U.K. Patent Application No. 201809157, filed Jun. 5, 2018, entitled KEY BLANK DISPENSING SYSTEM (Horsfall et al.); in U.K. Patent Application No. 201806414, filed Apr. 19, 2018, entitled KEYS (Horsfall); in U.K. Patent Application No. 201708957, filed Jun. 6, 2017, entitled KEY BLANK DISPENSING SYSTEM (Horsfall et al.); in U.K. Patent Application No. 201509700, filed Jun. 4, 2015, entitled IMPROVEMENTS IN OR RELATING TO KEY CUTTING AND KEY CUTTING APPARATUS (Horsfall et al.); in U.K. Patent Application No. 201607933, filed May 6, 2016, entitled IMPROVEMENTS IN OR RELATING TO KEY CUTTING AND KEY CUTTING APPARATUS (Horsfall et al.); in U.S. patent application Ser. No. 16/567,912, filed Sep. 11, 2019, entitled KEY CUTTING APPARATUS (Horsfall et al.); and in U.K. Design Application Nos. 4039724 and 4039725, entitled "MY KEY MACHINE Devices; Mikey the Robot Device" (Horsfall), each of which are incorporated by reference herein in their entirety.

A first embodiment of the present invention provides a method for making duplicate keys comprising the following steps: presenting by a display a user interface having a first set of selectable elements configured to receive a user inputs; identifying a make, model and year ("MMY") and/or VIN representing a target vehicle for purposes of cutting a key blank based on a master key to operate the target vehicle; receiving a user input selecting a desired key blank from the set of at least one suggested key blank; presenting a user interface configured to instruct a user in a manner of presenting a master key for scanning and receiving on a scannable surface a physical "master" key having a keyblade; capturing by a vision system a set of images of the master key, determining a feature location of the master key, and targeting a laser and determining a set of locations of the master key keyblade; determining by a processor a set of physical parameters of the master key keyblade; inserting the selected key blank in a key blank holder for duplication; cutting by a key cutting component the selected key inserted in the key blank holder based at least in part on the set of physical parameters of the master key keyblade resulting in a duplicate key; determining by a processor whether the selected key blank requires programming to pair with the target vehicle and if the key blank requires programming, presenting a user interface configured to instruct the user in programming the duplicate key.

The first embodiment of the present invention may be further characterized in one or more of the following manners: further comprising providing via a user interface a key blank identifier associated with the selected key blank and providing a set of location indicia corresponding to a defined location in a key blank storage compartment; further comprising providing by a user interface a "Quick Reference" identifier assigned to the selected key blank and present on the selected key blank or key blank packaging for confirming correct retrieval of the selected key blank from the key blank storage compartment; wherein the user interface presenting the set of at least one suggested key blank comprises a set of visual images representing the physical appearance of each of the set of suggested key blank for visual comparison with the master key prior to duplication; further comprising restricting an action based on an authorization step and presenting via a user interface a set of selectable elements configured to receive from the user an input corresponding to a set of authorization data to establish the user as being authorized to perform the restricted action and permitting the action upon establishing the user as authorized to perform the action; further comprising locking a set of at least one door providing access to one or more of the key cutting compartment, the master key scanning compartment, and/or the key blank storage compartment for controlling access to one or more such areas; further comprising determining by the vision system whether the scanned master key matches the selected key blank and upon confirmation of a match presenting the user with location data for retrieving a key blank from a key blank storage compartment and unlocking the key blank storage compartment thereby providing access to the selected key blank; wherein upon determining the scanned master key does not match the selected key blank, presenting the user with an indication of a failed match and prompting the user to confirm information pertaining to the master key; wherein upon determining the selected key blank requires programming to pair with the target vehicle, determining the type of programming required from a set of programming types and, based on the determined programming type, providing the user with a set of instructions to instruct the user on a set of programming procedures required to pair the duplicate key with the target vehicle, and performing the set of programming procedures and confirming pairing of the duplicate key with the target vehicle; further comprising determining, based on a set of stored OEM valid key code data, whether the master key physical parameters match a valid OEM code for the MMY input and/or other user inputs related to identifying the master key or target vehicle; wherein identifying a make, model and year ("MMY") representing a target vehicle for purposes of cutting a key blank based on a master key to operate the target vehicle further comprises iteratively presenting, based on a known set of compatible key blanks for the selected "MMY", a set of user interfaces having a set of selectable elements configured to receive user inputs representing additional identifiable characteristics of the master key; and wherein identifying a make, model and year ("MMY") or VIN representing a target vehicle for purposes of cutting a key blank based on a master key to operate the target vehicle further comprises presenting the user with a hierarchical sequence of prompts based on a decision tree and a set of received user inputs in response to the sequence of prompts.

A second embodiment of the present invention provides a kiosk-based system for making duplicate keys, the system comprising: a processor in communication with a memory having a set of instructions executable by the processor stored therein, the set of instructions comprising a set of key cutting instructions, a set of key scanning instructions, and a set of user interface instructions; a database having stored therein key related data including a set of automotive key data; a display adapted to present a set of user interfaces and to receive user inputs based on user actions associated with selectable elements presented via the set of user interfaces; a set of user interfaces having a set of selectable elements configured to receive user inputs selecting a make, model and year ("MMY") and/or vehicle identification number ("VIN") representing a target vehicle for purposes of cutting a key blank based on a master key to operate the target vehicle; a master key scanning device comprising a vision system and a scannable surface adapted to receive for scanning a physical "master" key having a keyblade, wherein the vision system is adapted to capture a set of images of the master key, and wherein the processor executes the set of scanning instructions to determine a set of physical parameters of the master key; a key blank storage compartment containing key blank products for retrieving and cutting; a key blank selection user interface having a set of selectable elements comprising a set of at least one suggested key blank based on the MMY user inputs and, being adapted to receive a user input selecting a selected key blank from the set of at least one suggested key blank; a key cutting device adapted to receive a selected key blank and cut the received key blank based at least in part on the determined set of master key physical parameters to create a duplicate key; wherein the processor accesses key data stored in the database and executes instructions to determine whether the duplicate key requires programming to pair with the target vehicle, and, if the duplicate key requires programming, to generate a set of instructions to instruct the user in programming the duplicate key.

The second embodiment of the present invention may be further characterized in one or more of the following manners: wherein the database includes a set of residential key data and further comprising a user interface having a set of selectable elements configured to receive a user input differentiating between a residential key duplication process and an automotive key duplication process; further comprising a user interface configured to instruct a user in a manner of presenting a master key for scanning; further comprising a user interface configured to instruct a user in a manner of inserting the selected key blank in a key blank holder of the key cutting device for duplication; further comprising a key blank identifier associated with the selected key blank and a set of location indicia corresponding to a defined location in a key blank storage compartment, wherein the key blank identifier is presented via user interface; further comprising a "Quick Reference" identifier assigned to the selected key blank and present on the selected key blank or key blank packaging for confirming correct retrieval of the selected key blank from the key blank storage compartment, wherein the Quick Reference identifier is presented via user interface; further wherein the key blank selection user interface comprises a set of visual images representing the physical appearance of each of the set of at least one suggested key blank for visual comparison with the master key prior to selection and duplication; further comprising an authorization user interface comprising a set of selectable elements configured to receive from the user an input corresponding to a set of authorization data stored in the database to establish the user as being authorized to perform a restricted action and permitting the action upon establishing the user as authorized to perform the restricted action; further comprising a set of at least one door providing access to one or more of the key cutting compartment, the master key scanning compartment, and/or the key blank storage compartment for controlling access to one or more such areas, and further comprising a set of at least one locking mechanism operable by action of the processor to lock and unlock the set of at least one door; wherein the processor, based on operation of the vision system, determines whether the scanned master key matches the selected key blank and, upon confirmation of a match, presents the user with location data for retrieving a key blank from the key blank storage compartment; wherein the set of user interface instructions includes a set of programming instructions executable by the processor, the system further comprising a set of programming tools, wherein the processor executes the set of programming instructions to determine the selected key blank requires programming to pair with the target vehicle, determine the type of programming required from a set of programming types and, based on the determined programming type, providing the user with a set of instructions to instruct the user on a set of programming procedures and programming tool required to pair the duplicate key with the target vehicle; further comprising a set of programming tools including an OBD programming tool configured to be connected to the target vehicle OBD interface and to provide prompts to the user in connection with pairing the duplicate key with the target vehicle; wherein the automotive key data stored in the database includes a set of valid OEM key code data and wherein the processor is adapted to access the stored set of valid OEM key code data, compare the valid OEM key code data with the master key physical parameters, and determine whether the master key physical parameters match a valid OEM key code for the MMY input; further comprising a communications interface adapted to communicate with a central server over a communications network, whereby data and instructions may be uploaded and/or downloaded in a bi-directional manner with the central server.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIGS. 8-16 provide a series of user-interface screens and elements configured to identify a master key, duplicate the master key and cut a key blank, and pairing a duplicate key with a vehicle according to the present invention.

FIG. 21 illustrates an exemplary user-interface screen and elements configured for use in pairing a duplicate key with a vehicle according to the present invention.

FIGS. 28-35 provide exemplary screens in connection with the vehicle/key identification and selection process of the present invention.

DETAILED DESCRIPTION

Figure 1:
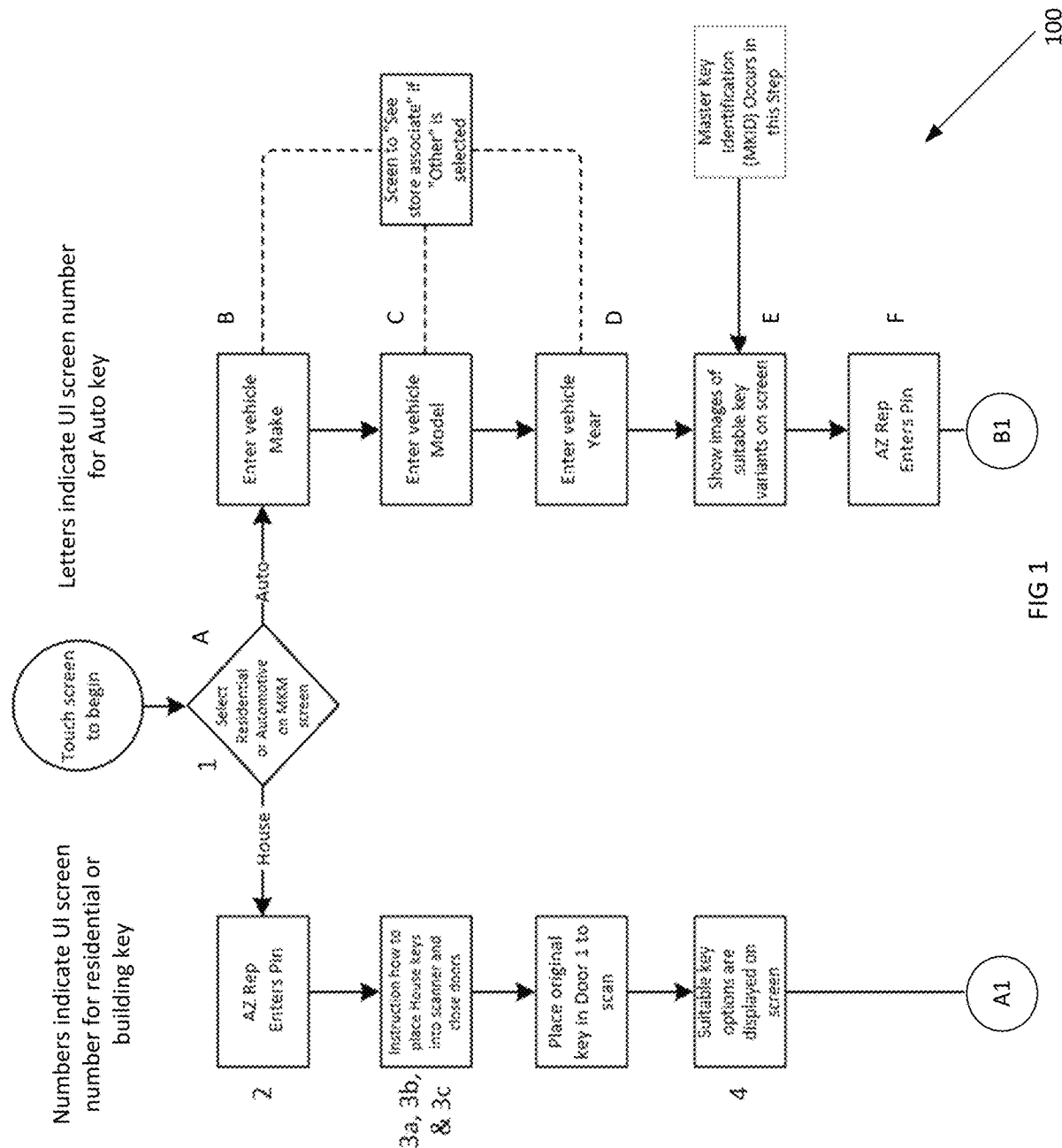
FIGS. 1-5 provide a series of flowcharts illustrating an exemplary user-interface driven process for identifying a master key, duplicating the master key and cutting a key blank, and pairing a duplicate key with a vehicle according to the present invention.
Figure 2:
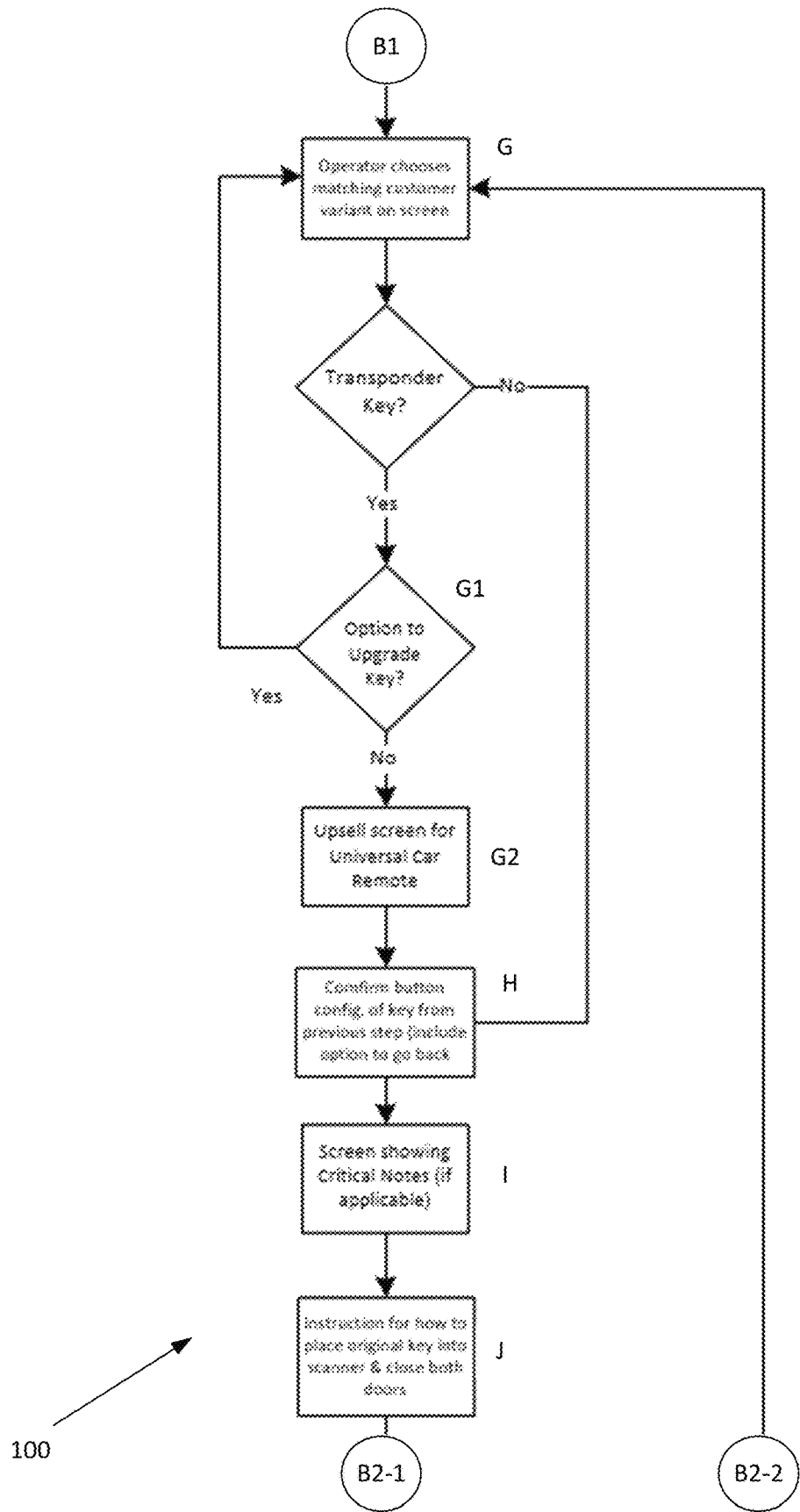
Figure 3:
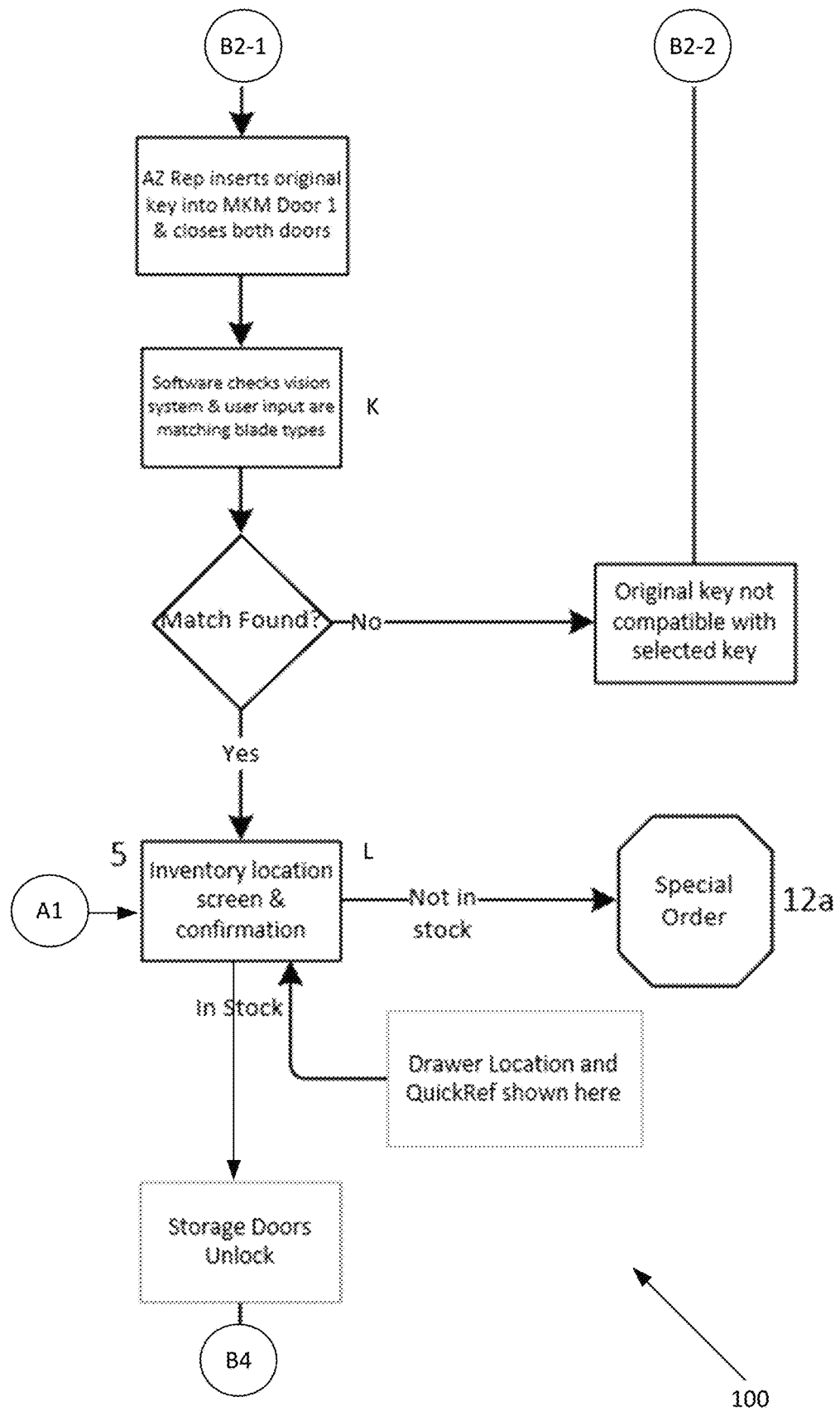

The present invention will now be described in more detail with reference to exemplary embodiments as shown in the accompanying drawings. While the present invention is described herein with reference to the exemplary embodiments, it should be understood that the present invention is not limited to such exemplary embodiments. Also, while the exemplary embodiments describe use of lasers, this is not limiting to the invention and one possessing ordinary skill in the art would understand the invention may be used in connection with other suitable means of presenting accurate and repeatable "lines" or "stripes" onto key structures discernable by a camera in connection with the processes described in detail hereinbelow. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

With reference to FIGS. 1-5, a series of flowcharts illustrate an exemplary user-interface driven process for identifying a master key, duplicating the master key and cutting a key blank, and pairing a duplicate key with a vehicle according to the present invention. In this exemplary embodiment, process 100 is used by a key scanning and cutting system, such as a system that may be located in a retail location such as an auto parts or hardware store, or at a hub location. Process 100 starts with a user operating a touch screen display having a set of user interface elements. The user selects either residential or automotive key for duplicating. Accordingly, there are two primary paths provided by the process 100—a residential path on the left side of the drawing with steps identified by numbers and an automotive key path on the right side of the drawing with steps indicated by capital letters.

Residential key cutting path begins at Step 1 with the user selecting via a user interface and associated elements they have a residential key for duplicating. On the residential path, a user or store representative enters a PIN or other form of access identifier to begin the process of scanning and copying a residential key. At Steps 3A-3C the system provides a set of instructions via a set of user interface screens to instruct the user or store representative 1) how to place the master key to be duplicated in the scanning device, and 2) how to select a blank key for duplication. With the master key properly placed in the scanning compartment, and the door to the scanning compartment closed, the image capture component of the key cutting machine scans the master key in a manner described in more detail below. Based upon the scanned image data at Step 4 suitable key options are displayed on a user interface screen on a display associated with the key cutting machine. A door associated with a key storage compartment within the key cutting machine may be opened either manually or by way of a of an electro-mechanical or electro-magnetic locking mechanism. A set of blank key identification information is displayed via a display associated with the key cutting machine including key blank location information in the key storage compartment. This key type identification information may include physical location of the key within the storage compartment. Also, as a form of redundancy and quality control, a quick reference identifier is provided to assure correct selection of the key blank occurs.

Figure 4:
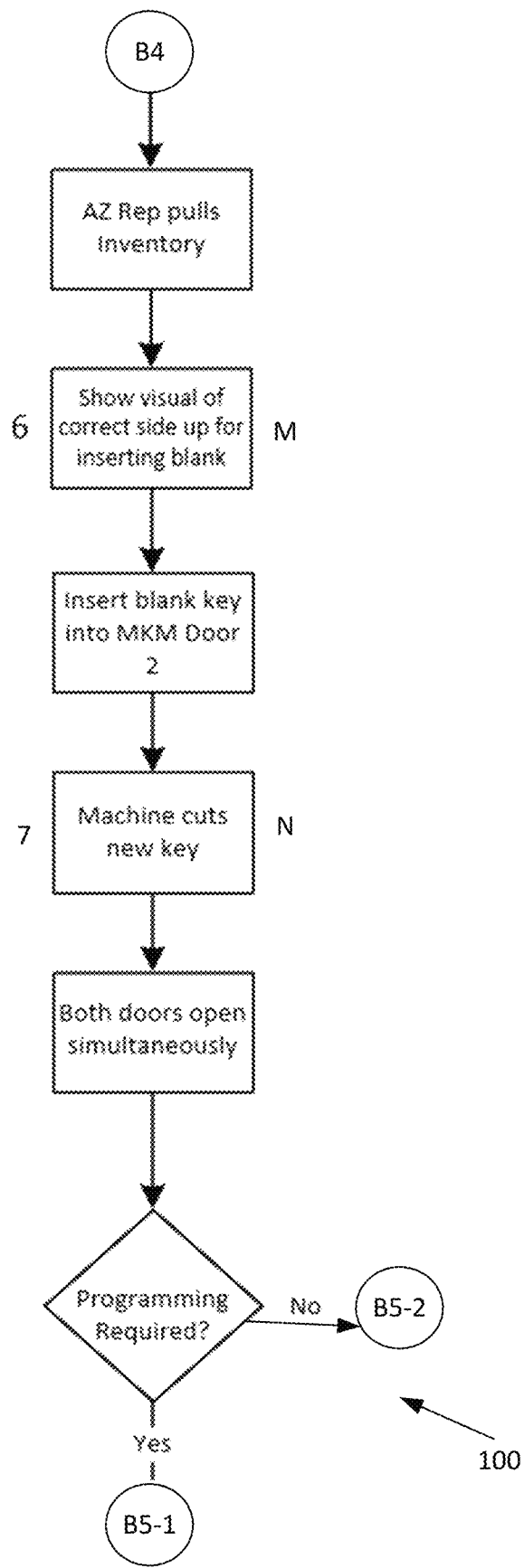
Figure 5:
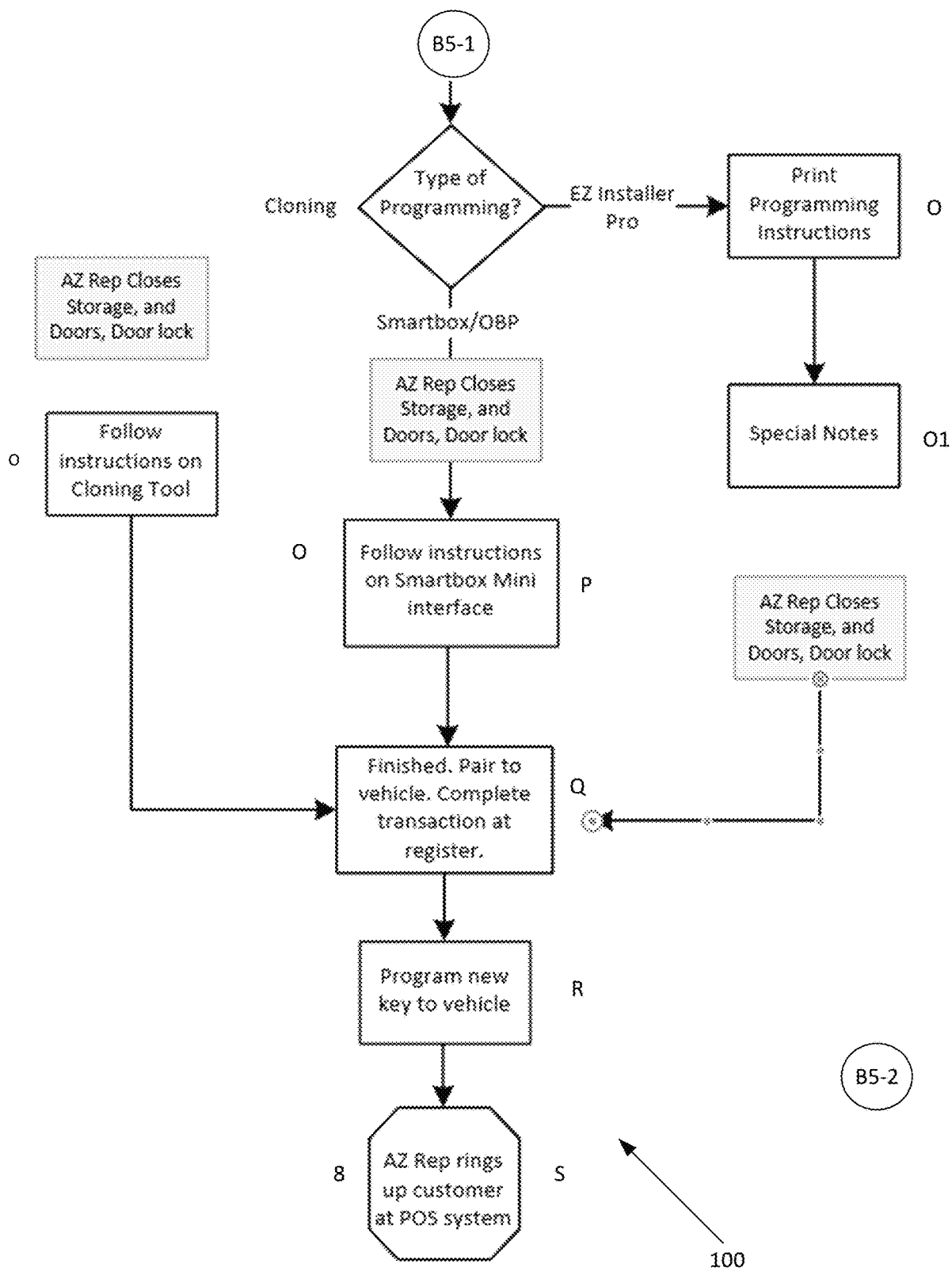

With reference to FIG. 4, at Step 6 the user is shown a visual of the correct orientation of the key blank for key cutting operation and a demonstration of insertion of the key blank within the key cutting compartment is provided. With the key blank properly inserted in the key cutting compartment, and with the door associated with the key cutting compartment properly closed to prevent injury, the key cutting machine cuts a bitting pattern into the key blank. Key cutting position and depth information, e.g., a template, is stored locally on a memory at the key cutting machine to facilitate proper cutting of the key blank based on known key betting pattern information. Based on the image data captured when scanning the master residential key, at Step 7 the key cutting machine cuts the key blank. Once the key cutting operation is complete the key cutting door opens and allows user access to the newly cut key blank. With reference to FIG. 5, at Step 8 the sales associate rings up the customer at a point of sale system to complete the transaction associated with the key cutting service.

Automotive key cutting and pairing path begins at Step A with the user selecting the "Automotive" user interface element presented indicating they have an automotive key for duplicating and the key may also have an associated transponder for pairing with a vehicle. With reference to the automotive keypath, at Step B the user enters vehicle make information associated with a particular make of the car for which the intended duplicate key is to operate. At Step C the user enters the vehicle model information and at Step D the user enters the vehicle year information. Collectively vehicle make, model and year information may be referred to as "MMY" information. The key cutting machine includes information, such as OEM key code information, that is used to help identify the particular type of key to be duplicated and the corresponding type of key blank to be selected for cutting. In addition to or in place of inputting MMY information, the selection process may include additional steps to identify the master key. For example, depending on what keys could exist for the particular MMY, to aid in quickly identifying the master key, the user interface may interpose and present a question to the user, like "Do you start your car by pressing a START button" or "Is there a G stamped on the key blade" or "is the FCCID this or that?".

At Step E, the key cutting machine displays a user interface that includes images of suitable key variants for selecting by the user. As there may be multiple key types associated with a given make model and year ("MMY") vehicle, it is important to clearly identify the master key for duplicating and key blank for cutting. By providing images of suitable key variants associated with the make model year information, the system enables a user to visually confirm a matching key blank for the master key to be duplicated. The key cutting machine includes a database containing master key identification data, which may be used to confirm the suitable variants available for the make model year vehicle input by the user. At Step F, the key cutting process may require a user, such as a sales representative, to enter a PIN or other access prerequisite confirming the user is authorized to continue the key cutting process. At Step G, the user chooses or selects the matching key type from the set of key variants provided on the user interface screen.

It is important to note that different key types have different key features and characteristics. See the exemplary key types included at FIGS. 25-27 and described in more detail below. Depending on key type, the system will identify, locate and potentially measure from different key features. Keys that have shoulders are generally "shoulder-biased" keys and the key blade length is measured or determined from the key tip to the shoulder or bottom of the key shank. Keys that do not include a shank or a shoulder are generally "tip-biased" and the blade length is measured or determined from the bottom of the key head to the key tip. Complicating things further, although an original master key, e.g., the original OEM key provided with a new vehicle, is essentially identical in configuration to an OEM master key blank configuration, there may be a range of configurations that differ in some respect to this master configuration, e.g., although the key blade is a common length, the shank or portion of the key blade outside the bitting or cut area may be different lengths. Accordingly, it is important in key cutting to identify and determine precise points or features for cutting a bitting set of cuts on a duplicate key blade. Herein the system described will identify one or more "predetermined location(s)" based on the master key known or observed or based on user inputs and may consult a database of known OEM or supplier key codes and types. For example, a laser may target a predetermined location on a master key blade or duplicate key blank that is a feature or a known distance from a feature, e.g., shoulder location, distance from key tip, key head, proximity to the cut closest to the head or distal to the key tip.

Based on the selected key type, the system determines whether the key is a transponder type key. If the key is not a transponder type key the process proceeds to Step H. If the selected key is a transponder type key then the process proceeds to Step G1, where the user is given the option to upgrade the selected key. If the user elects to upgrade the key the process returns to Step G and the user is presented with the set of matching variants for further selection. If the option is not chosen to upgrade the key then the process proceeds to Step G2 where the system provides the option for the user to select a different type of key, in this case a universal car remote key, which might have additional features over the selected key type. At step H, the user confirms the button configuration of the selected key and that Step I the user is presented with a screen showing critical notes if any are associated with the selected key. At Step J, the system presents instructions for how to place the original or master key into the scanner compartment in how to close the doors. The key cutting machine may have electromechanical or electromagnetic locks associated with both scanning and cutting doors to protect equipment and to prevent injury to users.

Once open, the user or the sales representative inserts the original or master key into the scanning compartment and positions the key as instructed and confirms that all doors are closed. At Step K, the system employs a vision system, such as a laser-based system, to compare the master key with the information input by the user in the user interface screens to determine if the master key matches the user selected key type. The physical master key, such as a vehicle key, is placed on a scanning surface such as a glass surface. The entire master key including the head, shoulder, keyblade, base, tip, and any fob, transponder, and/or remote will be placed on the scanning surface. Typically, this will involve sliding out a drawer having a glass plate or glass bottom or opening a door to a space or cabinet within the key scanning and cutting system and then placing the key onto the scanning surface and closing the drawer or door. The vision system may include a camera or imaging device to capture one or more images of an outline of the master key. A laser and a camera in the key scanning and cutting system are typically calibrated and focused to a distance based on the location or height of the scanning surface (e.g., a glass surface). The laser targets a location near the shoulder of the keyblade of the master key.

If a match is not found, then the determination is made that the original or master key is not compatible with the selected key for duplication and the user is prompted by to the user interface associated with Step G for further selection opportunity.

If a match is found by the vision system comparison, then the process proceeds to Step L associated with inventory location information and confirmation. If a selected key is not in stock, then the process prompts the user to proceed with a special order at Step L1. This may include out of inventory situations or items that are not normally maintained in inventory. At Step L the user interface screen is provided that includes inventory location information associated with the selected key type for duplicating. For example, a bin number, drawer identifier, shelf identifier, or other compartments identifier may be provided to the user representing a physical location of the selected key type. In addition to the physical location information, the present invention provides a quick reference (QR) identifier for use in selecting the proper key blank for duplication. For example, key types may be placed in the incorrect physical location, e.g., in the wrong bin, or may be misplaced during operation. By using a quick reference identifier, the system gives an added layer of protection against unwanted erroneous key copying and the associated waste and frustration associated with that.

A quick reference identifier may be confirmed visually or by machine readable processes and may be compared against the information provided on the user interface screen. Once a selected key type has been confirmed it is in stock, then the key cutting machine unlocks the storage compartment for access to stored key blank products. The user or a sales representative may then pull the selected key blank for copying from the storage location. At Step M, the user interface shows a visual of the correct orientation for inserting the selected key blank into the key cutting compartment. For example, there may be more than one key holding device or position to accommodate a wide variety of key types. The user interface will provide the user with visual and textual information for properly selecting the key holding device in the cutting compartment and for properly orienting the key blank for cutting. The user inserts the selected key blank into the key cutting compartment positioned as instructed and closes the door. The system may then lock the door closed to prevent any injury during key cutting operation.

At Step N, the key cutting machine cuts the key blank inserted in the key cutting compartment in accordance with the processes described herein below. Upon completion of the key cutting operation, the door to the key cutting compartment is opened as is the door to the master key scanning compartment. The user may then pull out the newly duplicated key from the key cutting compartment and the master key from the scanning compartment. Both doors are then shut to prevent any damage to equipment or injury when the key cutting machine is not in use.

The key cutting machine determines whether the selected key that is now duplicated requires programming if no programming is required for the type of key cut and duplicated then the process proceeds to the handling of the purchase and transaction associated with the key cutting service. If programming is required, then the system based on the key database determines a type of programming. In this embodiment there are three types of programming that may be associated with a key requiring programming. A cloning programming path is shown at FIG. 5. A cloning tool is selected based upon information presented via user interface. A user or sales representative follows instructions provided with the cloning tool. A cloning tool enables the system to clone a master key such that it is operable without going through a pairing process.

If the system determines that the type of programming requires use of a smart box mini interface then the user interface screen presents instructions as to how to use the smartbox many interface at Step P. The user interface may include the option of printing instructions and the key cutting machine may include a printing capability on the machine or the machine may be connected such as by wireless Bluetooth to a printer for printing instructions. The user uses the smartbox mini interface in conjunction with the instructions provided to pair the key to the intended vehicle. If the system determines that the type of programming requires the easy installer pro type device then the process proceeds to Step O to print the programming instructions including any special notes for use in pairing the key with the intended vehicle. At Step Q, once pairing is completed the user proceeds to a transaction to complete the sale associated with the key cutting service and duplicate key product. At Step R the system prompts a user with respect to programming an additional key for the vehicle and the process repeats itself in the event the user elects to have multiple duplicate keys made. Finally, the sales representative completes the transaction with the user and accepts payment from the user.

Figure 6:
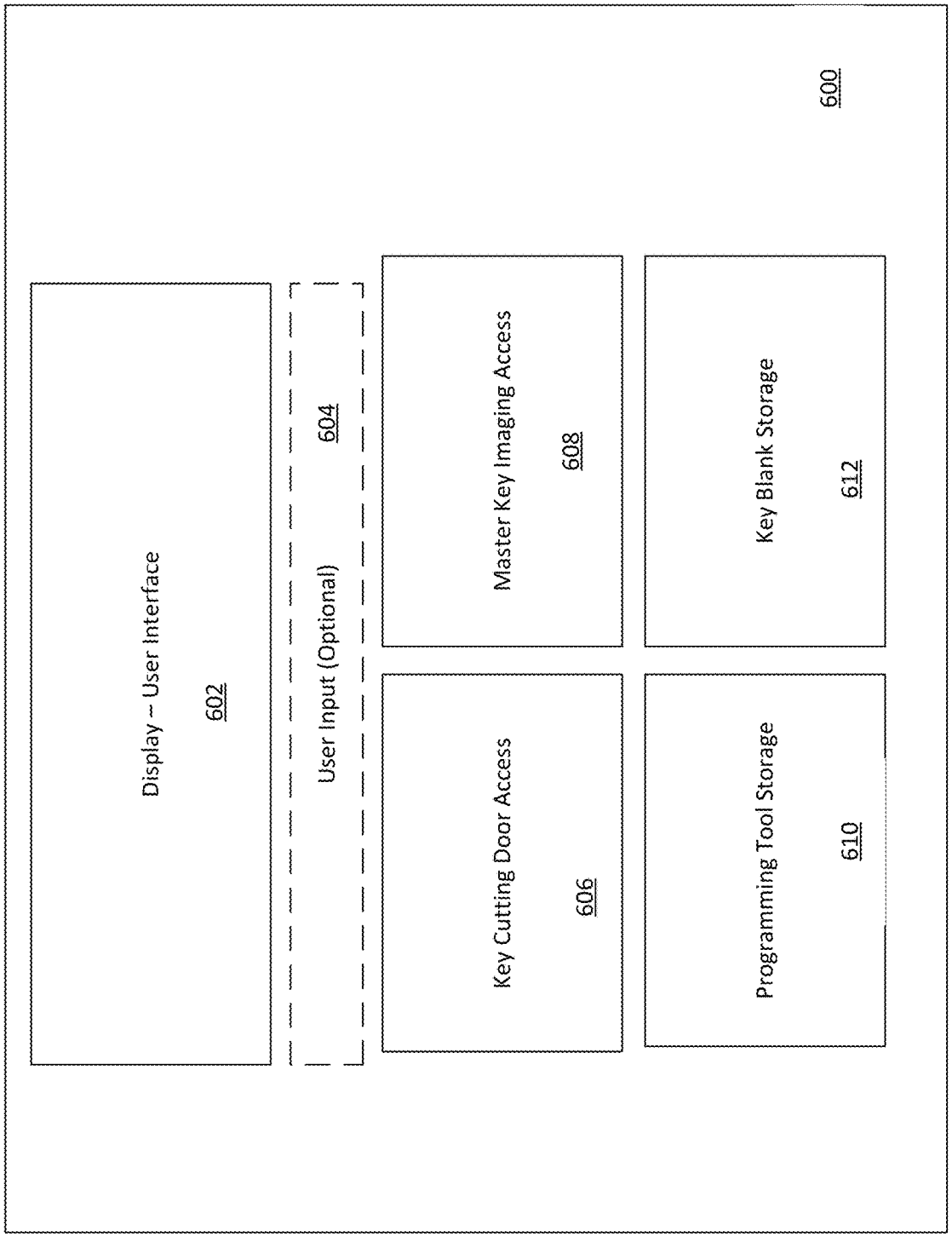
FIG. 6 provides a schematic diagram of a kiosk or stand-alone key cutting machine providing a user-interface driven process for identifying a master key, duplicating the master key and cutting a key blank, and pairing a duplicate key with a vehicle according to the present invention.

With reference to FIG. 6, a schematic diagram illustrates exemplary componentry in a kiosk or stand-alone key cutting machine illustrates a user-interface driven process for identifying a master key, duplicating the master key and cutting a key blank, and pairing a duplicate key with a vehicle according to the present invention. Here, the key cutting machine or kiosk 600 includes a display 602 adapted to present a series of user interfaces for interaction with users, including customers and sales representatives. The display may be a touch screen type device capable of interpreting hand touches on the screen for receiving user inputs and selections. Optionally a separate user input device 604 may be provide such as an alpha-numeric key pad or key board. A key cutting compartment 606 may include a lockable door for securing the contents and key cutting components contained in the kiosk 600. One or more key holding components are provided for placement of key blanks within the key cutting compartment 606 for cutting operation. An original or "master" key imaging compartment 608 may also include a lockable door and provides a scanning surface area for placement of a master key for scanning and duplication. A vision system including one or more lasers and cameras are provide for inspecting and imaging the master key. Indicia are provided for proper placement of the master key. A programming too storage compartment 610 contains one or more programming tools for either cloning duplicate keys from master keys or for pairing duplicate keys with target vehicles. A key blank storage compartment 612 is provided to house key blank inventory. Lockable doors may be provided for one or both of the programming tool and key blank storage compartments.

Figure 7:
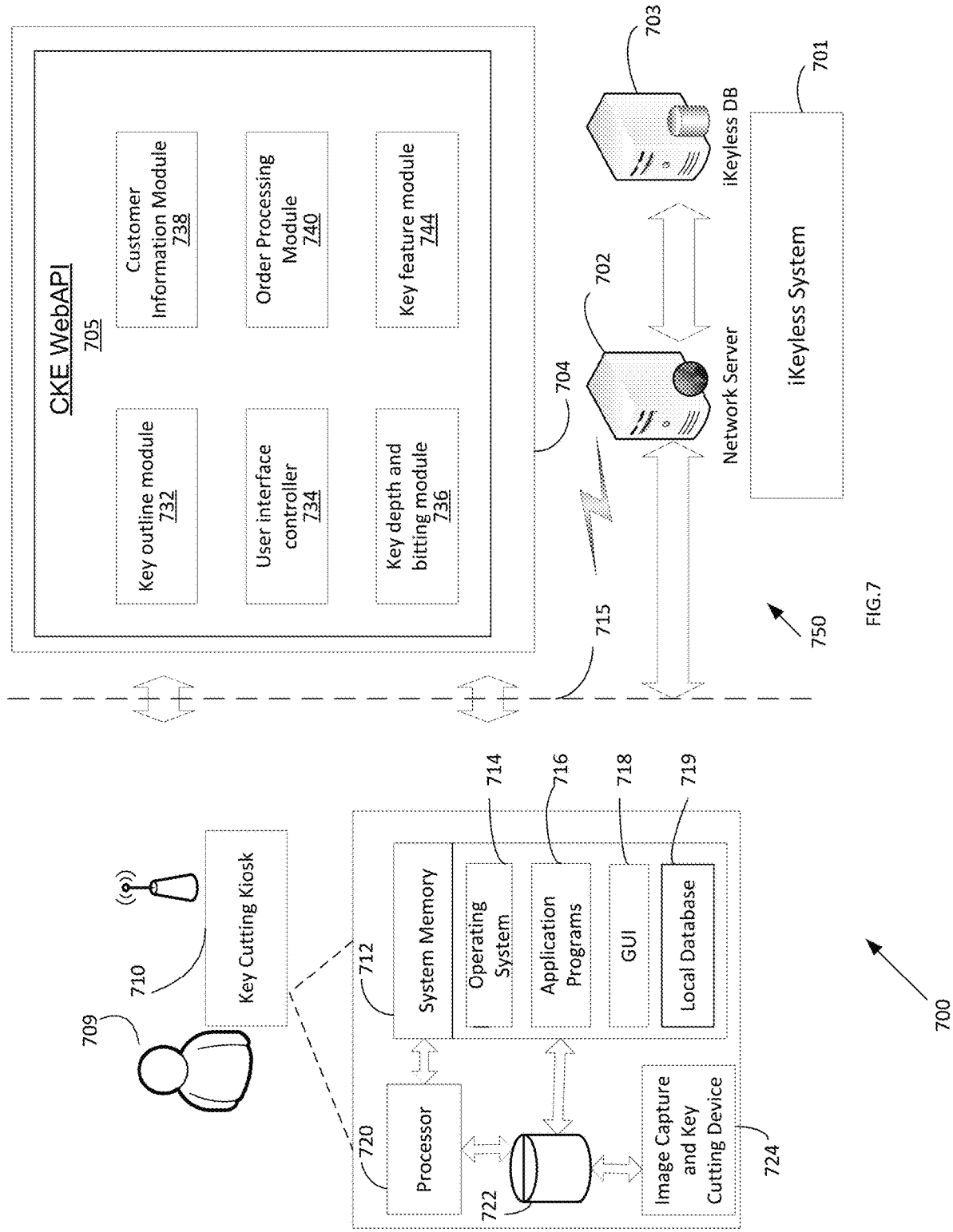
FIG. 7 provides a schematic diagram of an exemplary system architecture configured to provide a user-interface driven process for identifying a master key, duplicating the master key and cutting a key blank, and pairing a duplicate key with a vehicle and for connecting to remote devices for exchanging data according to the present invention.
Figure 9:
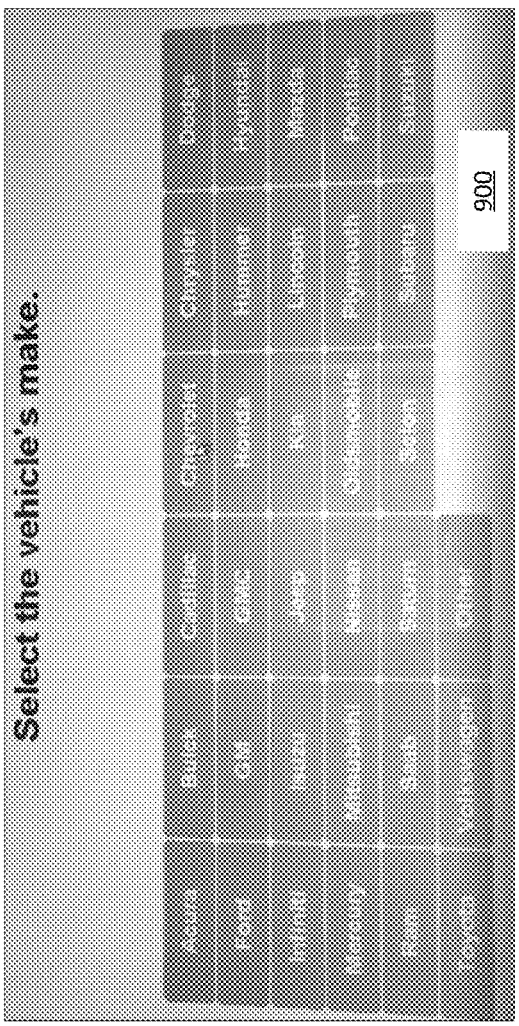

FIG. 7 provides a schematic diagram of an exemplary system architecture configured to provide a user-interface driven process for identifying a master key, duplicating the master key and cutting a key blank, and pairing a duplicate key with a vehicle and for connecting to remote devices for exchanging data according to the present invention. With reference to FIG. 7, a system diagram for a system 700 for creating replacement vehicle keys according to the present invention is provided. The system 700 includes a kiosk or stand-alone key cutting station 710 such as described herein for being located at retail outlets, e.g., auto parts stores, big box stores, grocery stores and other facilities where key cutting services is desired. The key cutting kiosk may be connected to a central key cutting service operation, such as iKeyless System 701 over a communications network 715 for continuous or occasional connection to upload and/or download data and instructions associated with key cutting operation. The kiosk 710 may also be configured to be connected with mobile devices or other computing devices for local access and manipulation.

The system 700 comprises an iKeyless or Car Keys Express WebAPI (Web Application Program Interface) 705 which may be part of a system environment 704 run on network server 702 and is the conduit, or interface, through which the remote kiosk 710 and the iKeyless System 701 sends and receives information to/from the iKeyless DB 703. The network server 702 may be in communication with the iKeyless database 703 which stores information used by the iKeyless System 701, including OEM key data for use by kiosk 710 and other connected machines to assist in making duplicate keys and in pairing keys with vehicles. For example, OEM and other key recognition information may be updated from time to time to freshen data stored locally at the kiosk 710. Also, transaction data associated with key cutting operations may be stored locally at the kiosk 710 and uploaded to System 701 such as for use in auditing sales data, inventory maintenance, machine maintenance, customer data and other valuable uses. The kiosk 710 may comprise a processor and a non-transitory memory which stores instructions that, when executed by the processor, transform the kiosk into a special purpose machine for key cutting operation. The iKeyless System 701 further comprises a key outline module 732, a customer information module 738, a user interface controller 734, an order processing module 740, a key depth and bitting module 736, and a key feature module 744, the features of which are discussed in further detail hereinbelow. The modules shown in system 704 may also, or a variation thereof, be stored locally at kiosk 710 for use in key cutting operations.

With the iKeyless System 701 in communication over communications network 715, such as a local area network, wide area network, or the Internet, with a distributed network of remote key cutting kiosks 710, data from the connected kiosks may be collected locally and maintenance may be performed in batch fashion to provide a network wide updating of programming and database assets. Each remote kiosk 710 is operated locally by a user 709, which may be a customer and/or a sales or service employee of the facility housing the kiosk. The remote kiosk 710 comprises a processor 720, system memory 712, local storage 722, and an image capture and key cutting device 724. Programs and software are loaded from the local storage 722 into the system memory 712 and may comprise an operating system 714, application programs 716, a graphical user interface ("GUI") 718, and local database 719. The GUIs stored at the kiosk include the user interfaces described herein in connection with FIGS. 8-16 and 21.

An application program 716 communicates with the local database 719 and provides a graphical user interface 718 that comprises a set of user interface elements for interacting with the application program. The WebAPI 705 provides a secure encrypted interface, exposed to the web, to/from which the remote access device application can send commands/requests and receive responses.

For example, the kiosk presents user interface 718 to a user 709 and receives information from the user to identify keys and select matching key blanks for copying and for handling programming and pairing of keys with vehicles. The image capture and key cutting device 724 may include a laser, such as for positioning and locating key features, and is adapted to capture images of master keys to be duplicated and applies image detecting and processing algorithms to determine information, e.g., bitting information, about the master key. The algorithms may include: the automatic detection of key features (e.g., base, tip, shoulder (if applicable), bottom, top, blade width, shoulder to tip distance); the auto-registration of a key image including the auto-rotation of the key, skew detection and auto-adjustment (detection of non-parallel key features) and auto-correction, stretch/compression detection (using, for example, known rules of shoulder to tip distance and blade width) and auto-correction; automatic detection of cut depths with visual indicators of the nominal cut depths for the detected bitting; zoom and pan option to make close-up, fine adjustments to the above features and registration information, and in the zoom mode, all detected key features and key bit cut depths are shown with visually indicated tolerance limits; automatic detection and highlighting of key features and key bit cut depths that break key rules; and the comparison of key bitting of multiple pictures at once to verify bittings are the same through a series of photos.

The automatic algorithms can, without manual manipulation, extract key cut depths and key bitting data with a high degree of accuracy. Images captured and used for extracting key information including bitting information may be saved and stored. Key cutting and transaction data may be exported from the kiosk 710 via the iKeyless WebAPI 705 for centralized use.

Key cutting and pairing operation may also include use of a mobile application, e.g., compatible and compliant with Apple iOS and/or Android standards, downloadable on customer or sales personnel smart phones. The user may connect, such as with Bluetooth, with a programming device and handle pairing operations via instructions provided on their phone. Key information may be stored and uploaded to the central database 703 for later use, e.g., making additional duplicate keys without the need for a master key being present. This may be particularly useful in fleet management situations or when a user loses the master key. The mobile application may interface, e.g., via the iKeyless WebAPI 705, to allow encrypted exchange of information, including a user interface for a user to create a new account or log into existing account, access previous orders for review of order progress or to re-order, take pictures of existing key, buy new keys, and buy upgrades to previous or existing key products. A user may order automotive keys or house keys through the mobile application.

Processing of the image or images of the master key to be copied comprises evaluating the image according to key bitting rules and determining if the key bittings determined from the image or images are within acceptable tolerances for a particular key type. This will eliminate invalid key bitting information from a damaged or worn master key from which a keyblade copy may not be cut. If an invalid bitting is determined from an image of a master key, an outline of the master key as determined by the system may be modified to create the best possible outline. A master set of actual or "valid" key codes within a set of potential codes associated with key bitting positions and depths may be used to ascertain if acquired master key data is valid. If the captured image and associated data do not match an actual valid key code for an identified make, model and year for a vehicle then the system can issue a warning and stop short of cutting a duplicate key.

A set of target key features are determined from this best possible outline to be used to create the keyblade copy. See keyblade feature diagram L at FIG. 20. A grid pattern may be overlayed on the key image to fit the key to the known specifications. The target key features comprise at least blade rotation, blade top line, blade bottom line, blade tip endpoint, blade shoulder line, shoulder to tip length, and blade width. This set of target key features is then compared to key bitting rules and tolerances to determine if the modified outline is an acceptable outline conforming to key bitting rules and tolerances from which a keyblade copy may be cut. For each key type or model of key in the system, the key bitting rules contain measurements and parameters such as number of bits, shoulder to first bit, bit to bit spacing, bit heights as measured from a key-type-defined reference line, and maximum adjacent cut specs (MACS).

The captured image is analyzed in real-time to ensure the image is of the quality needed for further processing and provides input back to the user. For example, if the user fails to place and position the master key as required in the image capture process the application running at the kiosk 710 may notify the user that the picture is not sufficient or may inform the user that they need to reposition the master key and recapture the image. Image processing algorithms to identify required key cuts includes software and algorithms that validates the captured image of the master key in real time. Additional key alignment algorithms for getting clean edge and surface images are also used. Another algorithm and process are used to identify and fix worn or damaged keys. This algorithm may identify and fix an outline of the master key in the captured image and adjust or geometrically change the outline including by adjusting the cut height to compensate for worn contours. Additional processes may be used to provide for better processing of a captured image, and these processes include limiting or compensating for image parallax, applying digital filters to the captured image, applying color or greyscale modes for higher quality images, applying edge detection and contrast enhancement filters or algorithms, and applying sequential imaging and filtering algorithms.

With reference to FIGS. 8-16 provide a series of user-interface screens and elements configured to identify a master key, duplicate the master key and cut a key blank, and pairing a duplicate key with a vehicle according to the present invention.

Figure 8:
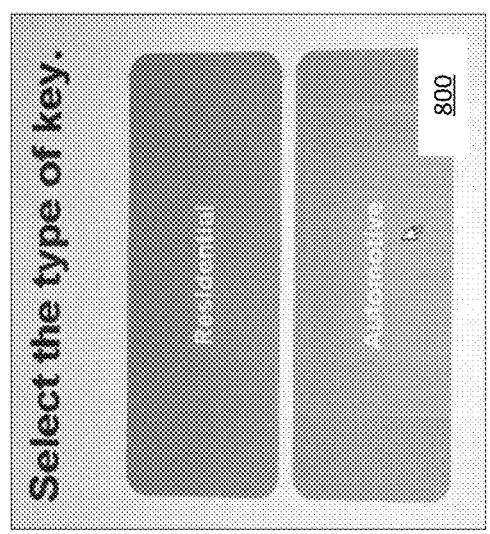
Figure 10:
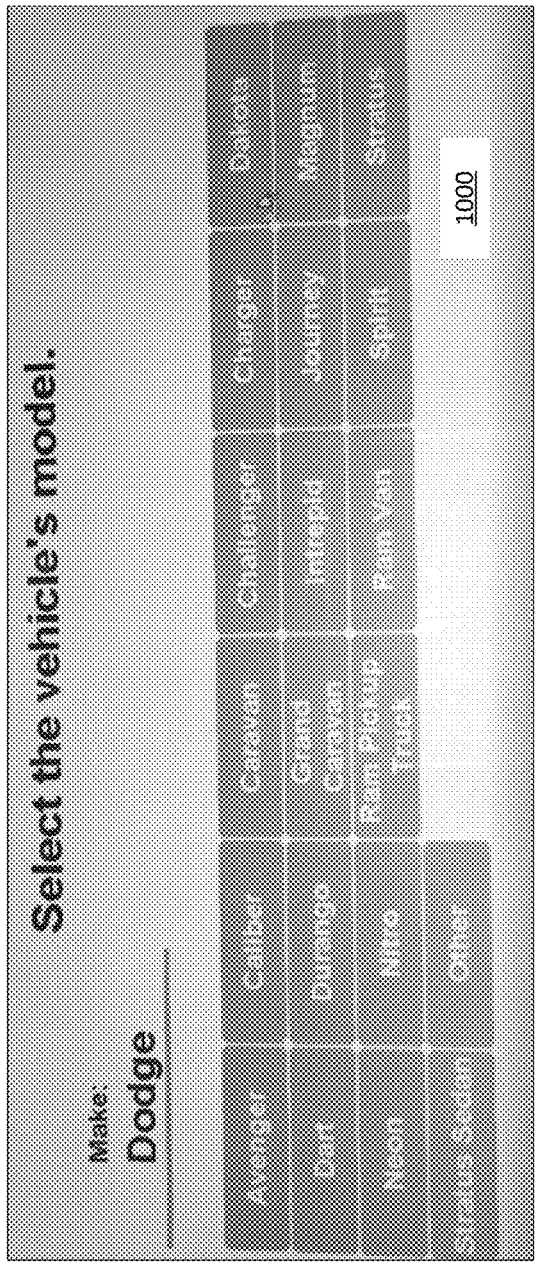
Figure 11:
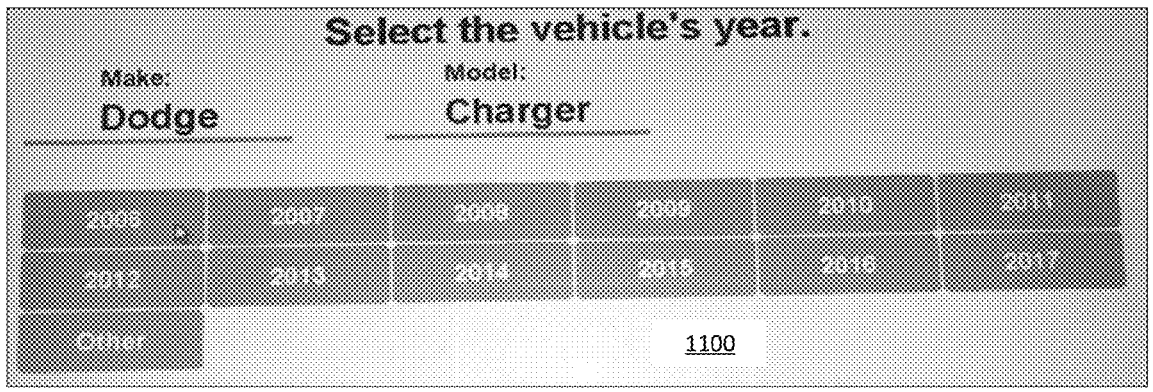
Figure 12:
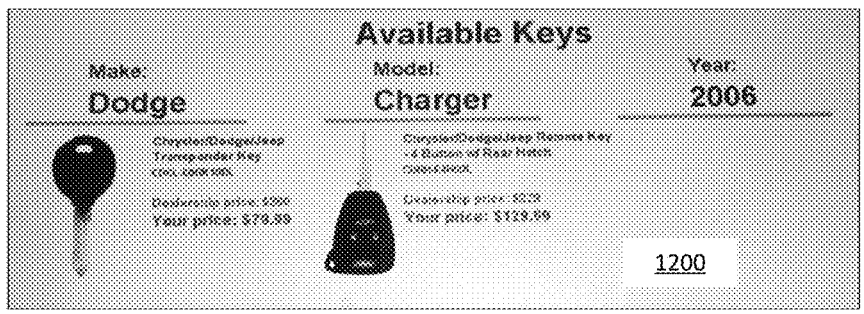
Figure 13:
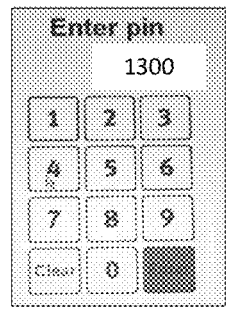
Figure 14:

The user interface screen 800 shown at FIG. 8, corresponds with the initial process Step A of FIG. 1 for selecting between residential or automotive keys for duplication. Upon selecting the automotive user interface element of screen 800, the system proceeds to display the user interface 900 shown in FIG. 9, which presents a set of vehicle make options for the user to select from and corresponds to Step B as described above. Upon selecting, for example by clicking on the user interface element "Dodge," the make of the vehicle intended to be operated by the duplicate key, the process presents the user with user interface 1000 shown in FIG. 10. This user interface 1000 corresponds with Step C of FIG. 1. After selecting the model, the user is presented with the user interface screen 1100 of FIG. 11 and selects the vehicle model year—in this example the GUI element "2006" is selected. User interface screen 1100 corresponds to Step D discussed above. In this example the user has selected model year 2006 for a Dodge Charger vehicle. The user interface screenshot 1200 of FIG. 12 shows two separate variant keys that match the make-model-year entered by the user. User interface screen 1200 corresponds to step E described above. In this example the user interface screen 1200 displays a key type corresponding to a Chrysler Dodge Jeep transponder key having part number CDCL EOGK 10DL. Depending on system configuration a user may be permitted to select from the key variance displayed on the user interface 1200 Or the system may require a sales representative to enter a pen number via user interface 1300 and FIG. 13. User interface screen 1300 corresponds to Step F described above. Next, the user, or the sales representative after entering an authorized PIN number via the user interface of FIG. 13, is presented with user interface screen 1400 for selecting a desired key from the available variant keys. User interface screen 1400 corresponds with Step G described above. Upon selecting a key from the set of variant keys displayed via user interface 1400, the system determines whether the selected key is a transponder type key.

With reference to FIG. 15, a user interface screen 1500 is presented that includes a visual aid related to the cut scan door indicators. The user interface 1500 instructs the user to "open the cut door and place the key blank in the red spring. If the key has buttons they should face up." Instructions relating to how to place the original or master key into the scanner corresponds to step J discussed above. The user interface screen 1600 of FIG. 16 includes a visual aid related to the key blank locator indicators such as the physical location of a key blank in the key storage compartment. In this instance the user is instructed to quote retrieve CDCL-EOGK10DL Key blank located at drawer D, bin 12 and includes a quick reference identifier 30. The user interface screen 1600 corresponds with Step L discussed above. The user interface screen 1500 or user interface screen 1600 may include a visual image showing the appropriate positioning of a key blank in the key cutting compartment and corresponds to Step M discussed above. After the user inserts the key blank and positions it appropriately in the key cutting compartment, the key cutting machine cuts the duplicate key.

With reference to the incorporated by reference disclosure provided in U.S. Prov. Pat. App. No. 62/970,661, entitled SYSTEMS AND METHODS FOR CREATING DUPLICATE KEYS, Robertson et al., filed Feb. 5, 2020 (113083.017PRV), FIGS. 4-7 and related text provide detailed description of exemplary processes for scanning an image of a keyblade, for decoding a scanned image of a keyblade, and for cutting a duplicate key based on OEM key data and the scanned data associated with the master key scanned. These processes may be used in the further processed disclosed herein in connection with the present invention.

Figure 17:
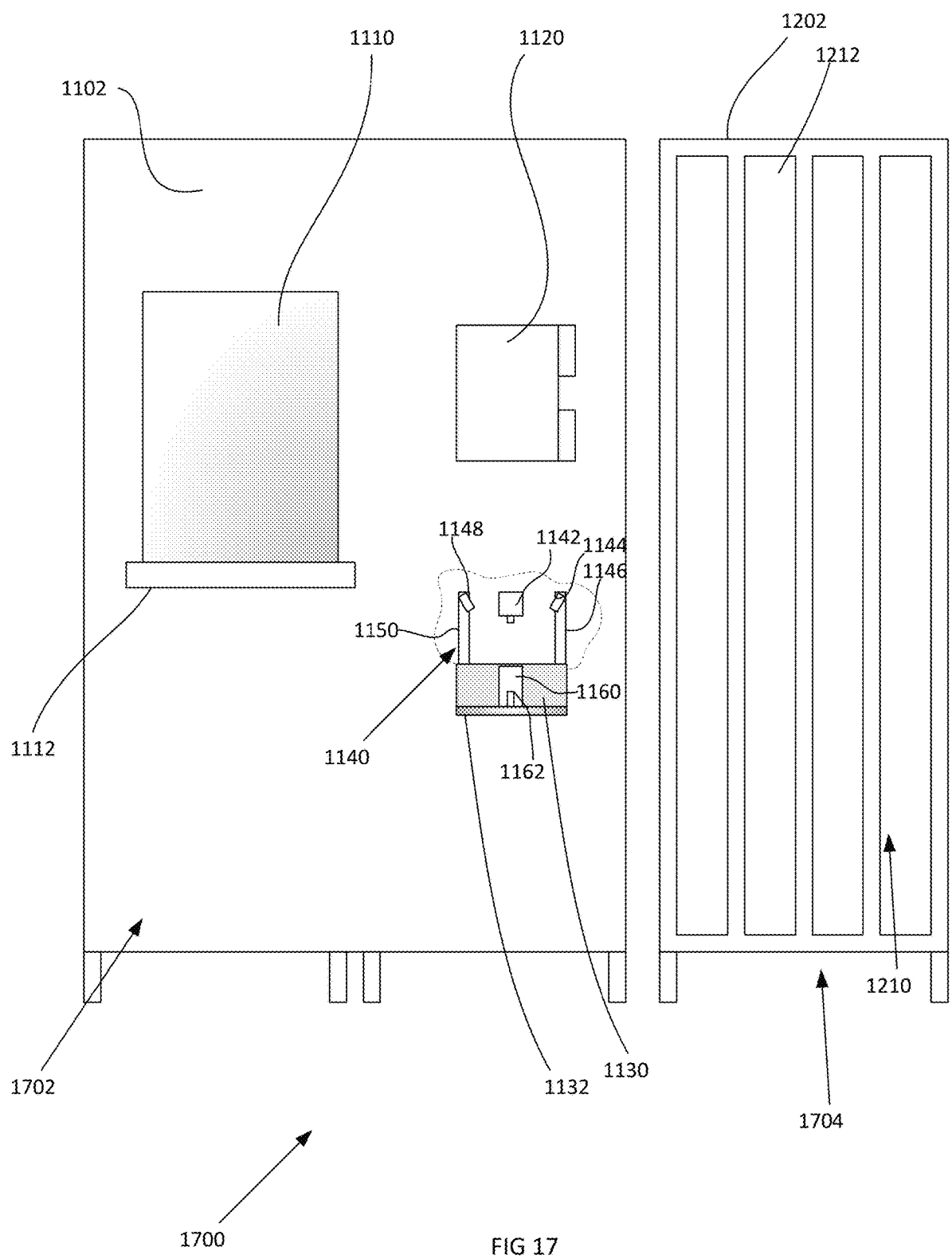
FIGS. 17-18 provide front and perspective views of an exemplary kiosk or stand-alone key cutting machine showing elements of an embodiment of a key scanning and cutting system according to the present invention.
Figure 18:
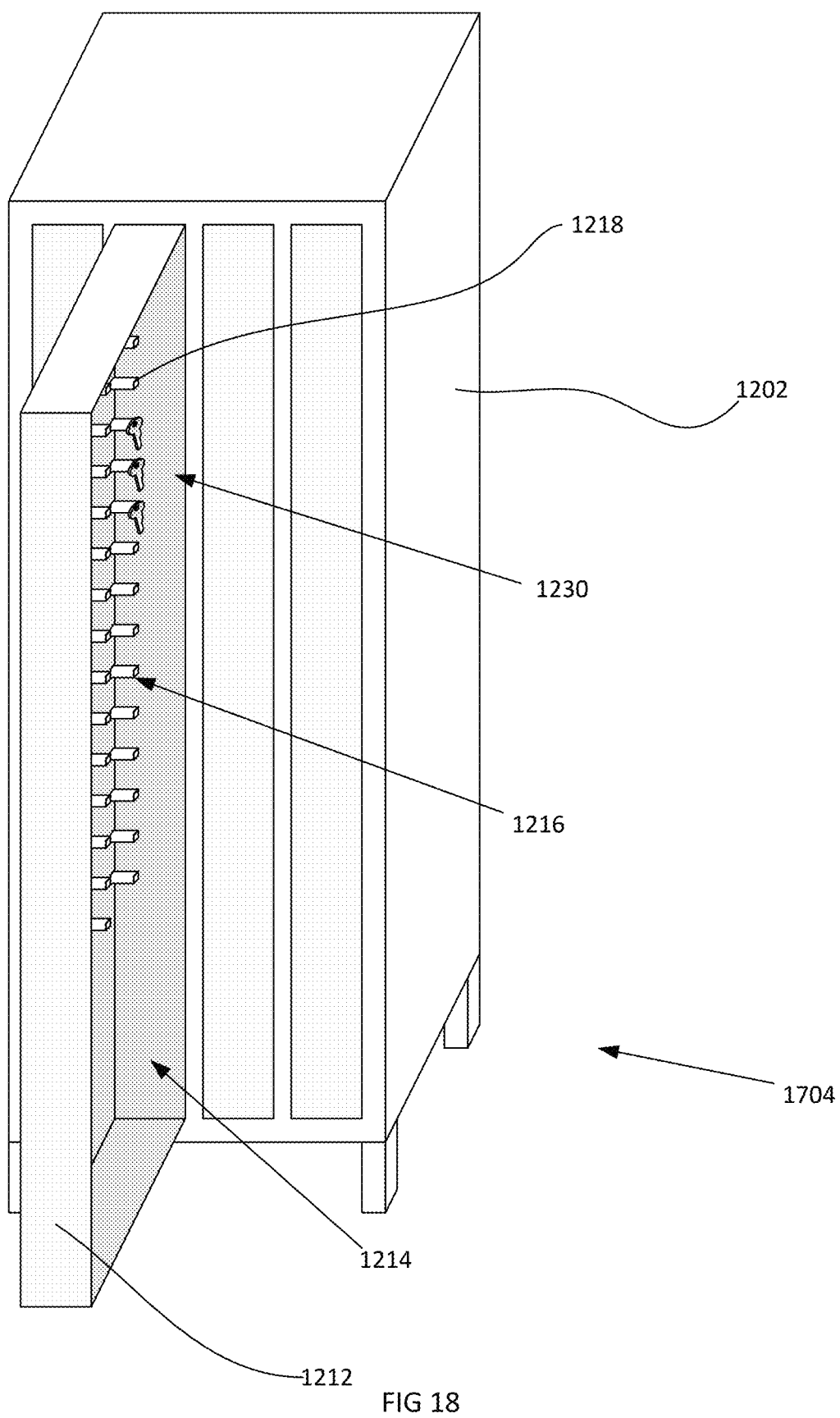

With reference now to FIGS. 17 and 18, views of a key scanning and cutting system 1700 comprising a key scanning and cutting apparatus 1702 and key stock storage system 1704 are provided. The key scanning and cutting apparatus 1702 may be the key scanning and cutting system described hereinabove with reference to the processes described in FIGS. 1-5. The key scanning and cutting apparatus 1702 comprises a main body or housing 1102 on the front or face of which a user interface or display 1110, a set of user interface elements 1112, a key cutting opening 1120, and a key scanning opening 1130 are disposed.

The user interface 1110 provides for the display of information, instructions, and for the input of user command related to functions or services provided by the key scanning and cutting apparatus 1100 including the scanning, selecting, cutting, and ordering of replacement or cut keys for a customer's master key. The user interface 1110 is configured to present the series of user interfaces illustrated in FIGS. 8-16 and 21 and described herein. The scanning opening 1130 may further comprise a scanning surface 1132 which may be a glass plate. In the present embodiment, the scanning opening 1130 is covered by a lockable door or may be disposed in a slidable drawer in the housing 1102 of the key scanning and cutting apparatus 1100.

A customer's master key to be scanned is placed in the scanning opening 1130 and the scanning apparatus 1140 captures a 3D profile of the customer's master key. A clamping apparatus 1160 may be used to secure and position the master key to be scanned using a clamping opening or key slot 1162. A set of lasers, which may comprise one or more lasers 1144 and 1148, may be positioned on tracks 1146 and 1150 to be used to project or emit a laser line onto the keyblade of the master key. The tracks 1146 and 1150 may be tracks, arms, or other suitable positioning means for adjusting the position of the lasers 1144 and 1148 relative to the master key being scanned. An image capture device 1142, which may be a digital camera device, captures images of the laser line on the keyblade for generating the 3D profile of the master key.

A key blank or key stock is placed in the key cutting opening 1120, which may be covered by a lockable swinging or sliding door, for the key blank to be cut into a cut or replacement key based on the customer's master key. The key blank is selected and retrieved from the key stock storage system 1200 in accordance with the user interfaces and related processes described herein.

In the exemplary embodiment of FIGS. 17 and 18, the key stock storage system 1704 comprises a set of vertical sliding drawers 1210 in the body or housing 1202 of the key stock storage system 1200. A lockable cover door may be provided to prevent access to the product stored in key stock storage system 1704 except in connection with the key duplication operation of the machine 1702. Each drawer, such as drawer 1212 has an interior space in which a plurality of storage locations 1216 are disposed. The storage locations 1216, such as storage peg 1218, may be pegs, hooks, slots, or containers capable of holding or storing one or more key blanks, such as key blanks 1230. The storage location 1216 may be removable and reorganizable such that an operator may configure the storage locations 1216 in any manner suitable to the operator, such as in a grid configuration.

Although the user interfaces will present the user with a location descriptor corresponding to a location within the key stock storage system 1704, key blanks may be placed incorrectly when restocking the storage system or may become misplaced over time. This can result in confusion to the user in that an incorrect key, i.e., a key that does not match the key identified in the selection process, being in a bin, shelf, drawer, compartment or other storage unit identified by the user interface. As an added layer of assurance in the key blank selection process, the present invention provides a set of Quick Reference identifiers ("QRs") is provided and is associated with product contained in the key stock storage system 1704 and with product displayed via the set of user interfaces described herein. In this manner, a further level of product categorization is provided to facilitate user selection of key blank product thereby avoiding waste and frustration. The added use of QR references in the selection process reduces the risk of the wrong key being selected and cut. This is even more beneficial when keys are misplaced in the bins or storage units either when replacing inventory or over time as the machine is used and the storage section accessed.

Figure 19:
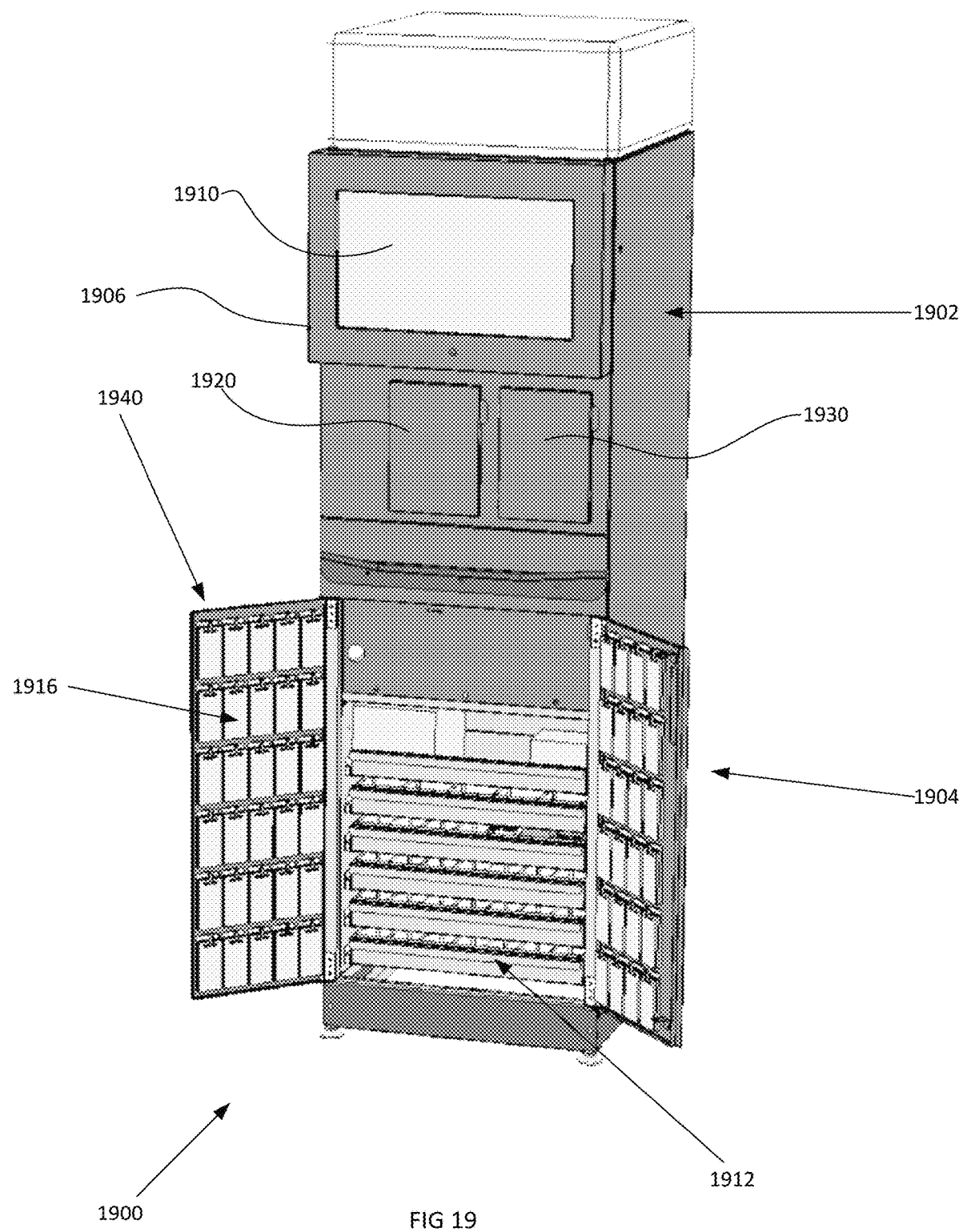
FIG. 19 provides a front perspective view of an exemplary kiosk or stand-alone key cutting machine embodiment of a key scanning and cutting system according to the present invention FIG. 20 provides a series of perspective views A-K of exemplary key types for use with the key scanning and cutting system of the present invention.

With reference now to FIG. 19, a perspective view of a key scanning and cutting system 1900 comprising a key scanning and cutting apparatus 1902 and key stock storage system 1904 are provided. The key scanning and cutting system 1900 comprises a single housing 1906 in which the key scanning and cutting apparatus 1902 and key stock storage system 1904 are disposed. The key scanning and cutting apparatus 1900 includes a display and user interface 1910, first door 1920 which may be a key scanning opening, and second door 1930 which may be a key cutting opening is disposed above the key stock storage system 1904. A set of doors 1940 may open, such as by means of signal delivered to an electro-mechanical or electro-magnetic lock, to provide access to the interior of the key stock storage system which may comprise a set of horizontal drawers 1912 having individual storage compartments or areas for holding key blanks or key stock, and a set of storage locations 1916 disposed on the interiors of the set of doors 1940. The set of storage locations 1916 may be a set of pegs or hooks including a set of magnetic or self-adhesive hooks secured to or installed on the interior of the set of doors 2240 in, for example, a grid configuration. Bin or storage indicators are provided to identify replacement keyblades and other key related equipment and are referenced to the user via the set of user interfaces displayed on display 1910.

As described above, in addition to bin or storage identifiers, a set of Quick Reference identifiers ("QRs") is provided and is associated with product contained in the key stock storage system 1904 and with product displayed via the set of user interfaces described herein. In this manner, a further level of product categorization is provided to facilitate user selection of key blank product thereby avoiding waste and frustration.

Figure 20:
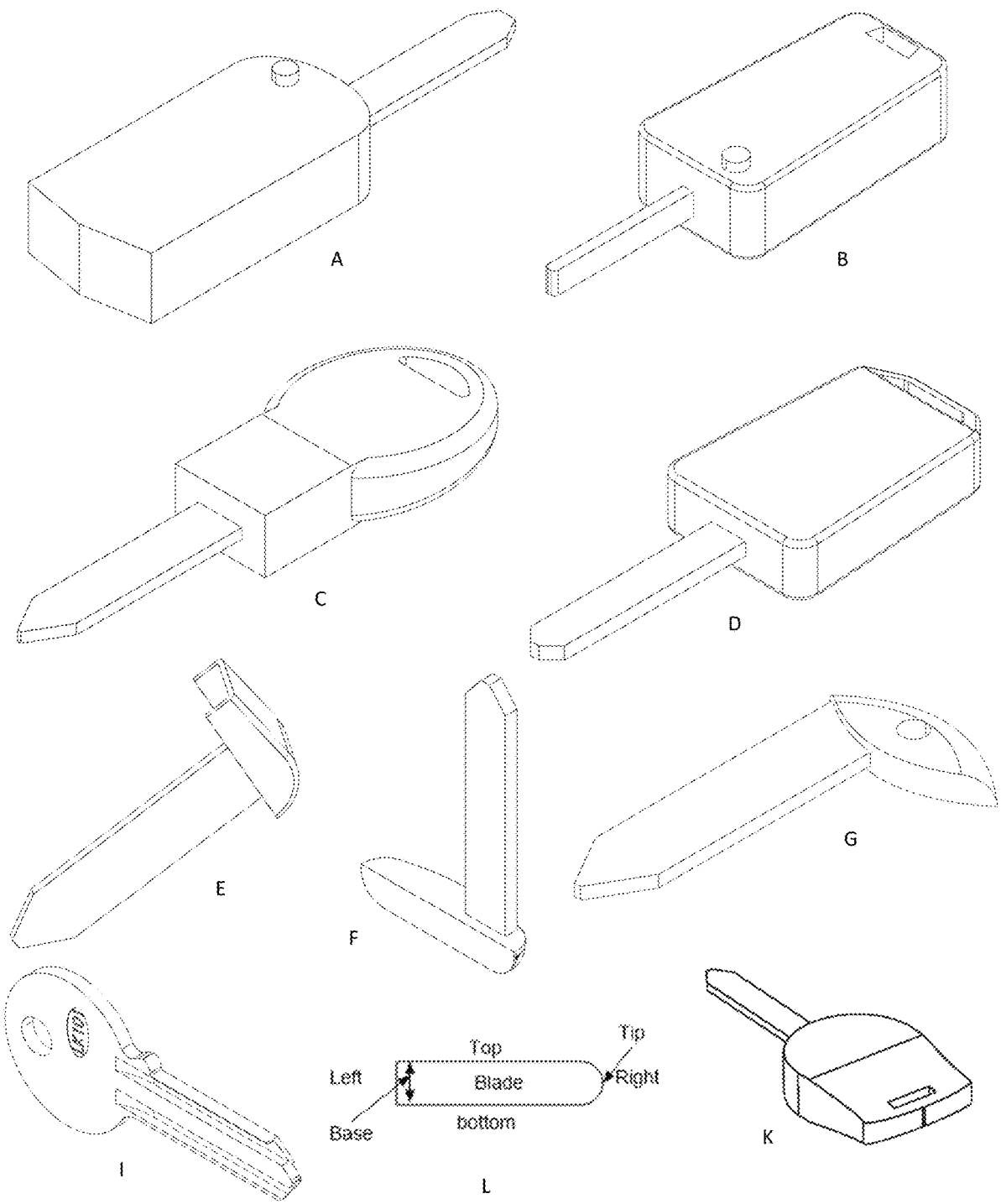

FIG. 20 provides illustrations A-K of a variety of typical keys and keyblades for which the key holder assembly is configured or adapted to receive. Illustration L provides a general scheme typically used to describe components or areas of keys and keyblades and as may be stored in exemplary key stock storage systems 1704 and 1904 used to make duplicate keys with the key scanning and cutting system of the present invention.

FIG. 21 illustrates an exemplary user-interface screen and elements configured for use in pairing a duplicate key with a vehicle according to the present invention. After the key cutting machine cuts the duplicate key, the system determines whether programming is required for the selected key. With reference to FIG. 21, a user interface screen 2100 is presented via the display provided on the key cutting machine and relates to instructions for pairing a selected key with a vehicle. The user interface screen 2100 corresponds with step O discussed above and the key programmer displayed corresponds with one of the three programming types described above in connection with Step O. In this example the user interface 2100 instructs the user to select the "smart box mini" type programmer located at drawer A in the key storage compartment. The user is directed to follow the instructions included with the programming tool and corresponds to Step P discussed above. As discussed above the type of programming may alternatively involve a cloning tool or may involve the easy installer pro tool. Exemplary manners of programming a transponder type key with a vehicle are discussed below in detail. Once the transponder key is paired to the target vehicle, the transaction may be completed at the register or any second key may be programmed to operate the target vehicle.

Figure 22:
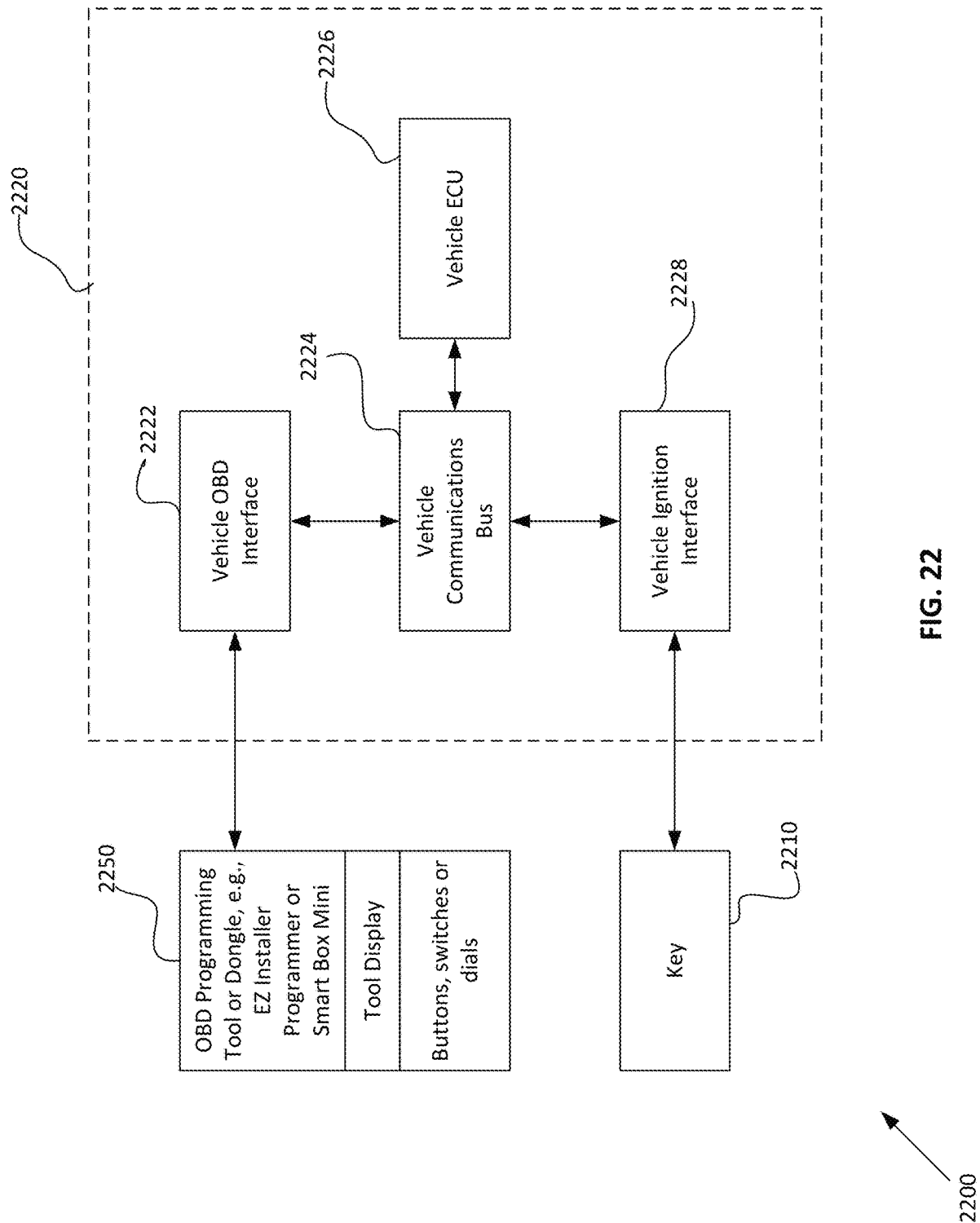
FIG. 22 provides is a schematic view associated with an exemplary key/transponder to vehicle pairing operation according to the present invention.
Figure 23:
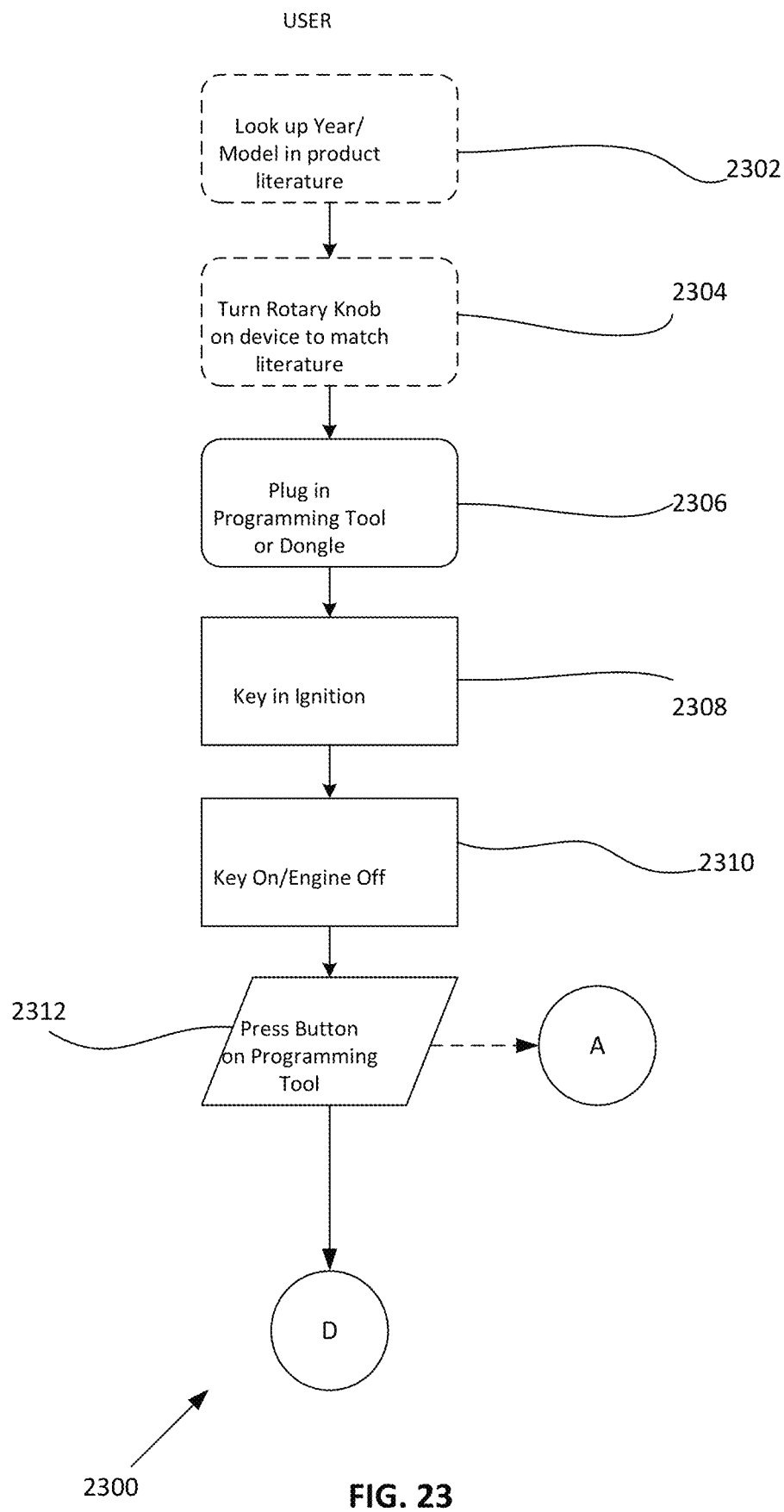
FIGS. 23-24 provide flow charts associated with an exemplary key/transponder to vehicle pairing operation according to the present invention.
Figure 24:
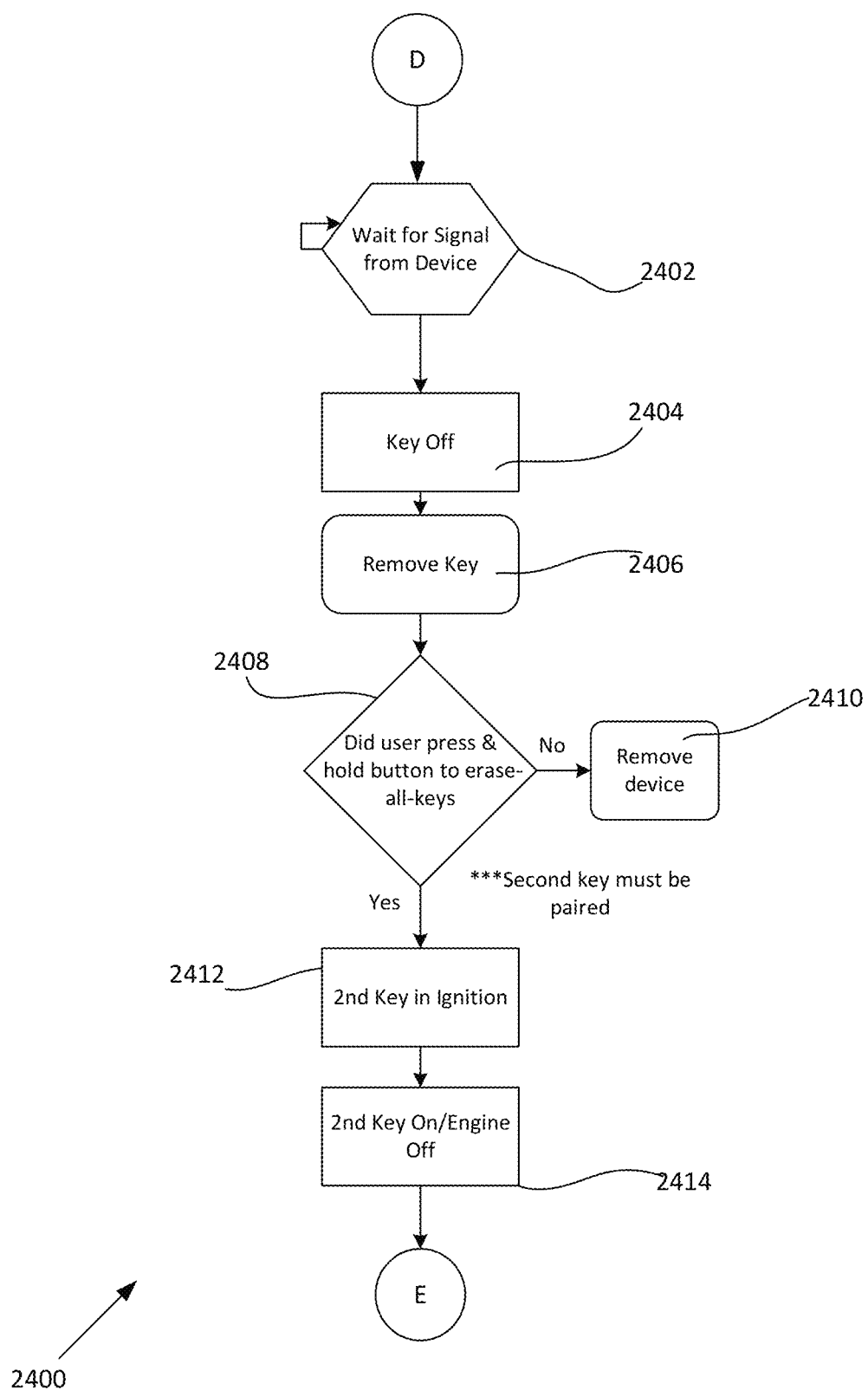

FIGS. 22-24 illustrate exemplary automotive key transponder and programming tool (dongle) for use in pairing a key with a target vehicle to be operated by the key. FIG. 22 provides is a schematic view associated with an exemplary key/transponder to vehicle pairing operation according to the present invention. A simplified block diagram of a system 2200 for pairing a vehicle key 2210 with a vehicle 2220 is provided. The vehicle 2220 comprises a vehicle OBD interface 2222, a vehicle communications bus 2224, a vehicle ECU 2226, and a vehicle ignition interface 2228. ECU refers to Electronic Control Unit but also represents other terms frequently used such as PCM (Powertrain Control Module) and ECM (Engine or Electronic Control Module) that represent components that perform similar functions in a vehicle. Often the term used for any given vehicle is manufacturer dependent. The vehicle OBD interface 2222, ECU 2226, and ignition 2228 communicate with one another via the vehicle communications bus 2224. Additional elements may comprise the vehicle 2220 including additional electronic and control components connected via the vehicle communications bus 2224. The dongle 2250 is connected to or inserted into the vehicle OBD interface 2222 to facilitate pairing of the key 2210 with the vehicle 2220.

FIGS. 23-24 provide flow charts associated with an exemplary key/transponder to vehicle pairing operation according to the present invention. A set of flowcharts illustrating a process for programming a vehicle key 2210 by a programming tool or dongle 2250 by user actions as shown in the processes 2300 and 2400.

Prior to powering on the device, at 2302 the user may determine, e.g., as determined by the system and displayed to the user (such as rotary switch location 7), the setting for the programming tool 2250, e.g., a rotary switch, and sets the switch to the proper position at 2304. The steps 2302 and 2304 may not be required if the communications mode, communications protocol, bus type, or set of commands and responses is automatically determined by the programming tool or dongle 2250. At 2306, the programming tool 2250 is inserted by the user into a vehicle OBD interface 2222. At this point the programming tool is powered up and, if it has a display or other operational indicia, presents the user with a set or series of instructions to follow and may include manipulating features of the vehicle 2220, e.g., ignition, start button, lock/unlock buttons, windshield wipers, radio, etc., and/or transponder key, e.g., buttons on key unit. For example, the user then puts the vehicle key 2210 into the vehicle ignition 2228 and turns on the vehicle 2220 at step 2310. When the vehicle 2220 is on, at step 2212 the user presses a button or switch on the programming tool 2250 and follows the set of instructions to pair the transponder key 2210 with the vehicle 2220. Once completed the pairing may be tested by turning on the vehicle with the newly paired key and performing other operations available on the key. Once completed the programming tool is disconnected from the OBD port. If the programming tool 2250 enters an error state during any step in the process or a communication error occurs, the process halts and an error alarm is sounded.

As shown in the exemplary user process 2400 of FIG. 24, at step 2402, the user waits for the success signal from programming tool 2250. Upon receiving the success signal from the tool 2250, the user turns the vehicle 2220 off at step 2404 and removes the key at step 2206. At step 2408 if the user did not press the button on the tool 2250 to erase all keys, the process halts at 2410 and the tool is removed. Otherwise, at step 2412, the user inserts a second or additional key into the ignition 2228 and turns the vehicle 2220 on at step 2414 and follows the steps to program the second or additional key. This may continue until all desired keys are paired with the vehicle 2220.

Figure 25:
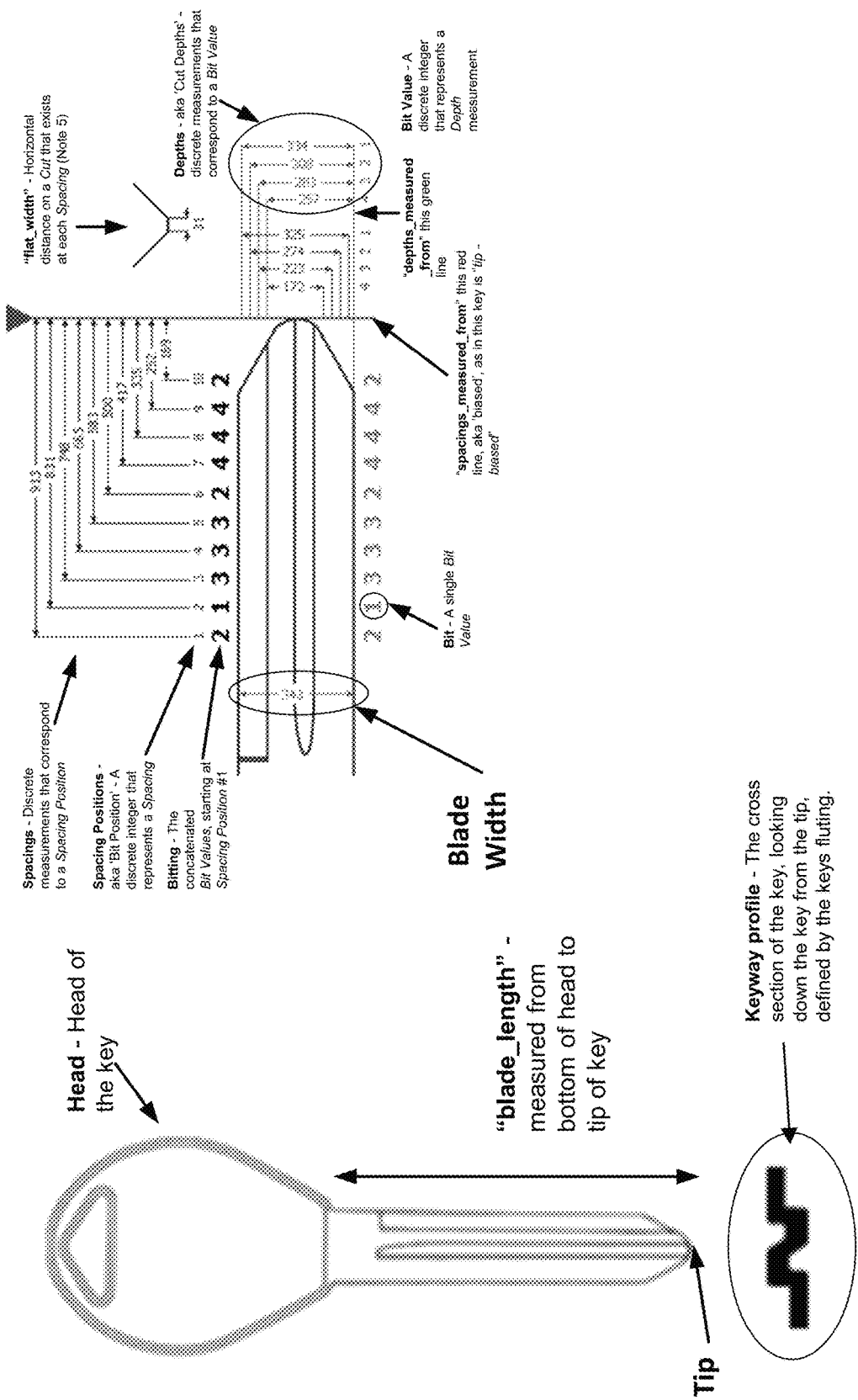
FIGS. 25-27 provide various views of exemplary key types having various sets of key features and showing key cutting spacings and parameters in association with operation of the key cutting system of the present invention.
Figure 26:
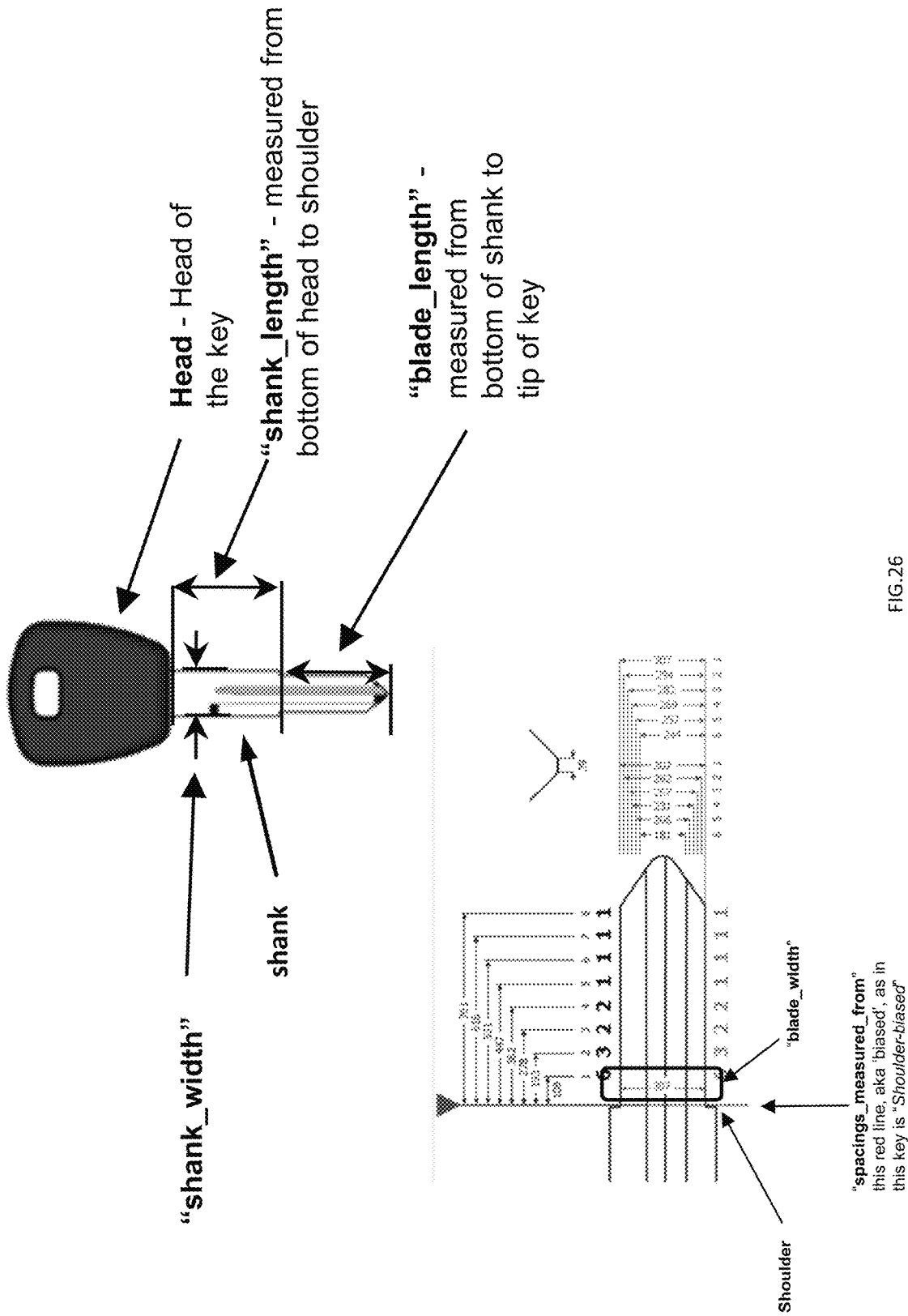
Figure 27:
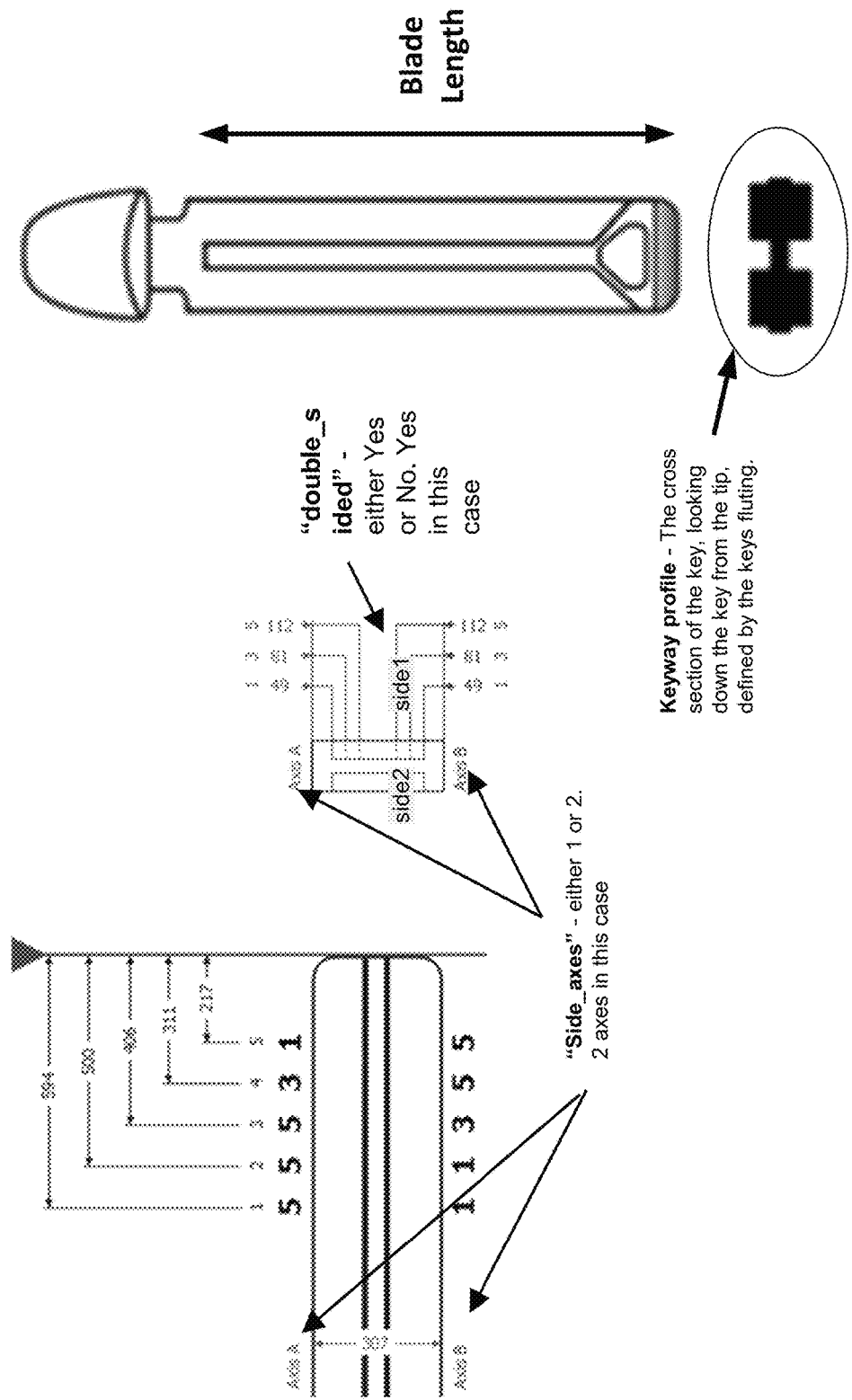

FIGS. 25-27 provide views of exemplary key types having key features and showing spacing and other criteria used in detecting positions, targeting lasers, and other key cutting operations. FIG. 25 illustrates an exemplary edge cut, tip-biased key type having a key head feature and a blade feature with an associated blade length and tip. An exemplary key profile is shown along with a set of spacing and bitting pattern and cutting criteria, e.g., depth of cut. FIG. 26 illustrates an exemplary shoulder-biased key type having a key head feature, a shank feature, a shoulder feature, and a blade feature with an associated blade length and tip. An exemplary set of spacing and bitting pattern and cutting criteria are also illustrated. FIG. 27 illustrates an exemplary high security (HS) tip-biased, double-sided key type having a blade feature with an associated blade length and tip. An exemplary key profile is shown along with a set of spacing and bitting pattern and cutting criteria.

FIGS. 28-35 provide screens in connection with the vehicle/key identification and selection process of the present invention and are exemplary of a selected type of vehicle—in this case a 2011 Toyota Camry. Certain kiosks or other stand-alone key interrogation machines will come equipped with transponder detection capabilities (determine if the master key is a transponder type or not) and others may not be equipped with this capability.

For Master Key Identification, a decision tree (set of questions) may be autogenerated for each MMY based on factors that exist in the database and a predetermined priority. The higher the priority, the more apparent the factor is and would therefore be asked first. For example, if the kiosk or machine has a transponder reader, the factor of "TRANSPONDER" is highest since this requires no input from the user. If the kiosk or machine does not have a transponder reader, the next most apparent factor to the user is whether the user starts their car using "Push to Start". The factor with the lowest priority would be, for example, the FCC ID, since this can sometimes either wear off or be hard to find (e.g., inside the battery compartment).

An exemplary sequence of user questions or prompts associated with FIGS. 28-35 is shown below. In one manner, preferably a hierarchical sequence for efficiency, may be presented via user interfaces having selectable or active elements to allow user input (which may be either selecting one button among a group of buttons or a text field for entering text responsive to the question or prompt presented on the display of the machine. In the following example journey, a 2011 Toyota Camry is selected. Notice that the decision tree provides a hierarchical set of questions that are used to drill down to the minimum number of products until all relevant questions remain. What is then ideally left, is a set of products that are visually easily distinguishable from each other. In this example, an exemplary hierarchical sequence associated with a MMY vehicle having an ID 527372011 and being a "Toyota" make, "Camry" model and "2011" year as selected based on user input. Associated with this MMY vehicle is the following sequence of prompts forming a decision tree to navigate the user efficiently through the vehicle and key identification process. The makeup of the prompts associated with a given MMY vehicle will preferably depends on the type of vehicle and the type of corresponding matching available key types associated with the vehicle so as to avoid unnecessary prompts and avoid user frustration.

```
{
  "vehicle": {
    "id": 527372011,
    "v_make": "Toyota",
    "v_model": "Camry",
    "year": 2011
  },
  "decision_tree": {
    "factor": "TRANSPONDER",
    "text": "This message should not be displayed.",
    "img": null,
    "options": {
      "DST 40": {
        "items": [
          "TOY KEY 085 COMBO"
        ],
        "transponder_command": "b"
      },
      "DST 80": {
        "items": [
          "TOY KEY 800",
          "TOY KEY 085.25 COMBO",
          "TOY KEY 085.75 COMBO",
          "TOY KEY 801"
        ],
        "question": {
          "factor": "BLADE_STAMP",
          "text": "Is there a letter stamped on your key blade? Please select it below. If not, please select None.",
          "img": null,
          "options": {
            "DOT": {
              "items": [
                "TOY KEY 085.25 COMBO"
              ]
            },
            "G": {
              "items": [
                "TOY KEY 800"
              ]
            },
            "None": {
              "items": [
                "TOY KEY 085.75 COMBO",
                "TOY KEY 801"
              ],
              "question": {
                "factor": "FCCID",
                "text": "Does your key list a 'FCC ID' on the back? If yes, please select it. If no, please select None.",
                "img": null,
                "options": {
                  "HYQ12BBY": {
                    "items": [
                      "TOY KEY 085.75 COMBO"
                    ]
                  },
                  "None": {
                    "items": [
                      "TOY KEY 801"
                    ]
                  }
                }
              }
            }
          }
        }
      }
```

```
                }
              }
            },
            "transponder_command": "r"
          },
          "None": {
            "items": [
              "TOY KEY 085 COMBO",
              "TOY KEY 350",
              "TOY KEY 800",
              "TOY KEY 085.25 COMBO",
              "TOY KEY 085.75 COMBO",
              "TOY 130 SMARTKEY",
              "TOY KEY 801"
            ],
            "question": {
              "factor": "PROXIMITY",
              "text": "Do you start your vehicle by pushing a button on your dash?",
              "img": null,
              "options": {
                "Yes": {
                  "items": [
                    "TOY KEY 350",
                    "TOY 130 SMARTKEY"
                  ],
                  "question": {
                    "factor": "FCCID",
                    "text": "Does your key list a 'FCC ID' on the back? If yes, please select it. If no, please select None.",
                    "img": null,
                    "options": {
                      "HYQ14AAB": {
                        "items": [
                          "TOY 130 SMARTKEY"
                        ]
                      },
                      "None": {
                        "items": [
                          "TOY KEY 350"
                        ]
                      }
                    }
                  }
                },
                "No": {
                  "items": [
                    "TOY KEY 085 COMBO",
                    "TOY KEY 800",
                    "TOY KEY 085.25 COMBO",
                    "TOY KEY 085.75 COMBO",
                    "TOY KEY 801"
                  ],
                  "question": {
                    "factor": "BLADE_STAMP",
                    "text": "Is there a letter stamped on your key blade? Please select it below. If not, please select None.",
                    "img": null,
                    "options": {
                      "DOT": {
                        "items": [
                          "TOY KEY 085 COMBO",
                          "TOY KEY 085.25 COMBO"
                        ],
                        "question": [ ]
                      },
                      "G": {
                        "items": [
                          "TOY KEY 800"
                        ]
                      },
                      "None": {
                        "items": [
                          "TOY KEY 085.75 COMBO",
                          "TOY KEY 801"
                        ],
                        "question": {
                          "factor": "FCCID",
                          "text": "Does your key list a 'FCC ID' on the back? If
```

```
yes, please select it. If no, please select None.",
                            "img": null,
                            "options": {
                                "HYQ12BBY": {
                                    "items": [
                                        "TOY KEY 085.75 COMBO"
                                    ]
                                },
                                "None": {
                                    "items": [
                                        "TOY KEY 801 "
                                    ]
                                }
                            }
                        }
                    }
                }
            }
        }
    }
},
    "unfiltered_skus": [ ]
}
```

With reference to FIGS. 28-35 and the sequence listed above, a series of screens guide a user through a series of prompts to confirm the identity of the vehicle type associated with a master key and a particular master key type desired to be duplicated or replaced. Note that for any given MMY vehicle there may be more than one available key type and each of the available key types may have a different feature set.

FIG. 28 illustrates a screen associated with a user interface having a set of selectable elements for receiving user inputs related to MMY information. In this example the user has selected from sets of respective pull-down lists "Toyota" as the make, "Camry" as the model and "2011" as the year of the target vehicle associated with the master key to be duplicated. Using the decision tree listed above, in a machine having a transponder, the user inserts the master key into an insertion feature or otherwise presents the master key to the kiosk or machine. Beginning with "factor": "Transponder", the machine determines if the key is a transponder type key and if so follows the decision tree and presents the user with interfaces directed to a transponder type key. Based on the decision tree listed above, beginning at "DST 40": {, the machine detects the transponder key as a DST40 type and presents to the user the screen shown at FIG. 29 related to the corresponding "TOY KEY 085 COMBO type key. Alternatively, based on the decision tree listed above beginning at "DST 80": {, if the machine detects the transponder key as a DST80 type a different set of prompts is used. As shown at FIG. 30, the machine presents to the user the screen related to the DST80 transponder type and prompts the user to enter information confirming if there is a letter or other indicia stamped on the key (here letter "G" or a dot) and showing an image to help the user find any such letter or indicia stamping. The user selects the element related to an identified stamping "DOT" or "G" and if there is none the user inputs "None."

FIG. 31 shows a set of screens presented based on the input of the user in screen of FIG. 30 and based on the decision tree. Here, if "DOT" is input, the user is presented with the key type "TOY KEY 085.25 COMBO." Here, if "G" is input, the user is presented with the key type "TOY KEY 800." Here, if "None" is input the user is presented with a further input selection screen with the prompt "Does your key list a 'FCC ID' on the back? If yes, please select it. If no, please select None." Upon selecting "HYQ12BBY" as the FCC ID on the key, the user is presented with the key type "TOY KEY 085.75 COMBO." If the user selects "None" then the machine presents the key type "TOY KEY 801."

FIGS. 32-35 relate to screens and prompts presented to users by a machine that does not have transponder sensing capability. FIG. 32 shows a screen prompting the user to identify if the target vehicle associated with the key is equipped with "Start" push button ignition feature and the user enters "YES" or "No." If the user enters "Yes" the machine steps through the screens shown in FIG. 33 and presents the user with the prompt "Does your key list a 'FCC ID' on the back? If yes, please select it. If no, please select None." Upon selecting "HYQ14AAB" as the FCC ID on the key, the user is presented with the key type "TOY 30 SMARTKEY." If the user selects "None" then the machine presents the key type "TOY KEY 350."

If the user enters "No" to the prompt shown on screen at FIG. 32, the machine presents the user with the screen shown in FIG. 34 and presents the user with the prompt "Is there a letter stamped on your key blade? Please select it below. If not, please select None." In this example the step confirms if there is a letter or other indicia stamped on the key (here letter "G" or a dot) and showing an image to help the user find any such letter or indicia stamping. The user selects the element related to an identified stamping "DOT" or "G" and if there is none the user inputs "None."

Figure 35:
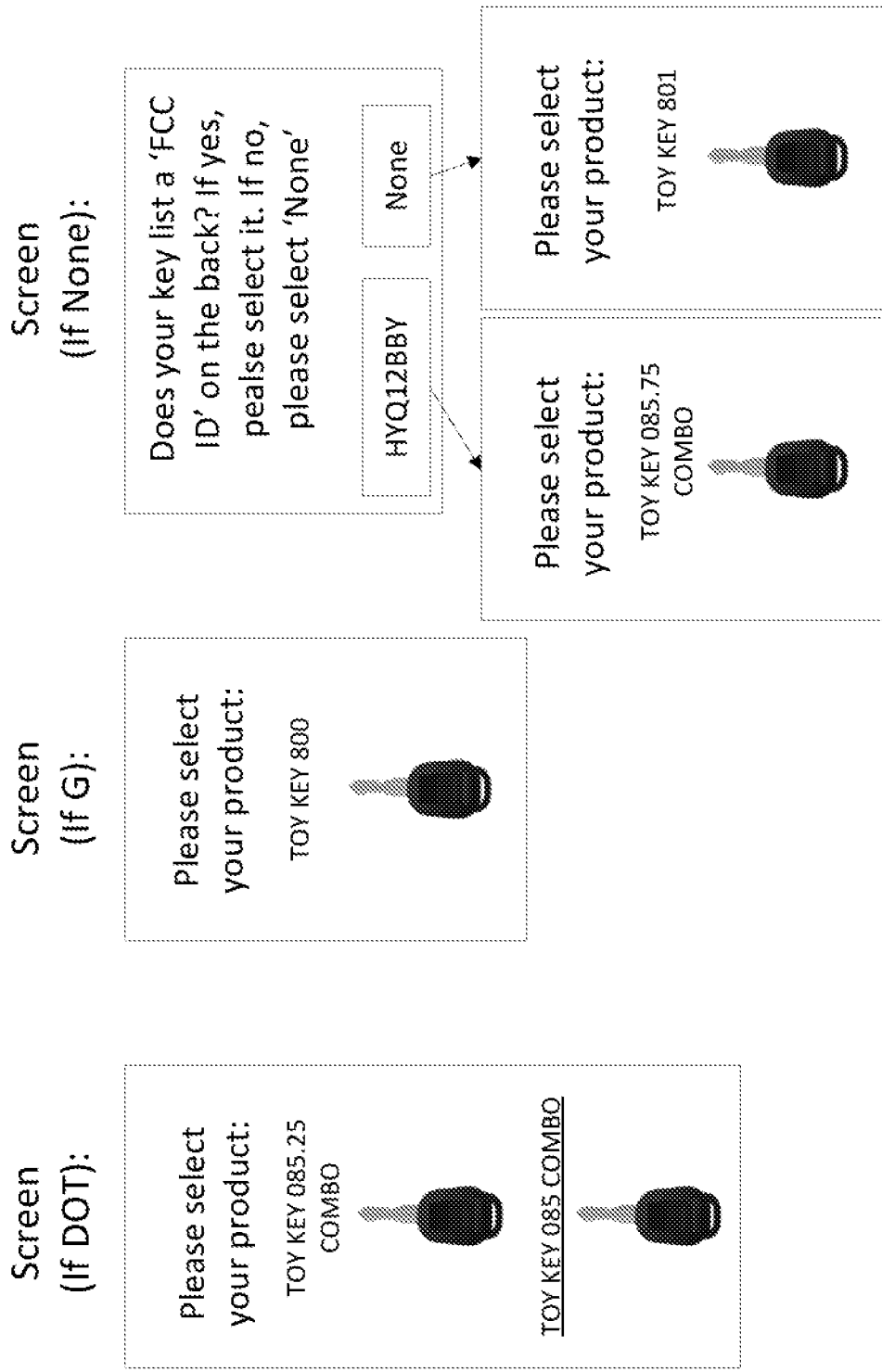

FIG. 35 shows a set of screens presented based on the input of the user in screen of FIG. 34 and based on the decision tree. Here, if "DOT" is input, the user is presented with two key types "TOY KEY 085.25 COMBO" and "TOY KEY 085 COMBO." Here, if "G" is input, the user is presented with the key type "TOY KEY 800." Here, if "None" is input the user is presented with a further input selection screen with the prompt "Does your key list a 'FCC ID' on the back? If yes, please select it. If no, please select None." Upon selecting "HYQ12BBY" as the FCC ID on the key, the user is presented with the key type "TOY KEY 085.75 COMBO." If the user selects "None" then the machine presents the key type "TOY KEY 801."

In addition, the key cutting machine or kiosk may be provided with transaction facilitating capabilities. For example, the local key cutting machine may include QR Code Generation capabilities or be capable of establishing a connection with a remote central service having QR Code Generation capabilities. In connection with key cutting services, QR codes may be generated (encoded) and processed (decoded). Specifically, after a customer initiates a master key duplication session at the key cutting kiosk, the customer enters master key identifying information, captures images of the master key for duplication, and selects a key blank product. A QR code is generated and associated with the session or transaction for further processing. A unique transaction ID is assigned to the session or transaction and that unique code is embedded in the generated QR code along with a URL or other link associated with the central service. The central service utilizes database structures to associate the transaction ID with the QR code and master key image data captured by and uploaded from the key cutting kiosk.

Other than the assigned unique identifier, the QR code may or may not include financial transaction data. In addition to the URL and transaction ID, other data may be embedded in the QR code related to the transaction, e.g., the Serial Number or other identifier of the key cutting kiosk; the store ID or identifier confirming the retailer and location where the key cutting kiosk is situated; the associate ID number of the employee logged in and helping the customer, if any, key product information, and/or customer information. In one manner, the additional data is stored at the central server with the associations made via a database and transaction record and other records, e.g., retailer and/or store record.

The QR code may be displayed at the key cutting kiosk and may be engaged by a user using a mobile device. At this point there are two exemplary paths for use of the QR code and completion of an order and purchase: PATH 1—internal store use of the QR code to identify SKU numbers or the like; and PATH 2—direct customer use of the QR code with the central service.

PATH 1—An order transaction and payment are processed locally with assistance of a store attendant, who may use a local store bar code associated with a duplicate key SKU or may use the generated QR code to access key product information. A retail sales associate can scan in the QR code(s) and/or bar code(s) to allow the customer to check out using the retail store's local POS system. As the key cutting kiosk and associated QR codes generated by it may not be integrated into the retailer POS, a separate bar code associated with the selected SKU may be used to enter a transaction via the on-site POS. In this situation, the bar code would not lend itself to retrieving the transaction information, but instead simply allow pulling up the price for the SKU(s) from the store's own POS system. The QR code, however, can act as either a bar code or a method of retrieval of the transaction data via the Internet by a store employee. The captured image data, store ID, and transaction ID and QR code may also be communicated to a central service associated with the key cutting kiosk. For example, if the local key cutting kiosk is out of inventory of a desired key blank, the key cutting kiosk may communicate with the central service to 1) order additional SKU(s) and/or 2) place an order for a duplicate key, which may be cut at the central service and later returned to the local store along with programming dongle and/or instructions. In this scenario the customer may later return to the store to obtain the duplicate key and pair the duplicate key with the target vehicle.

PATH 2—As an alternative to processing the transaction via the retailer POS, the user may be directly prompted at the key cutting kiosk to scan the QR code with their mobile device, e.g., smart phone. The QR code generated by the key cutting kiosk or central service and displayed at the key cutting kiosk includes a URL link. Upon scanning the QR code displayed on the key cutting kiosk, the mobile device is directed, by the embedded URL link in the QR code, to a webpage generated by the central server to process the transaction directly, e.g., a checkout page where credit cards and other forms of payment are allowed. In this path the user may complete a transaction to purchase the duplicate key directly from the central service. In this manner, the key cutting kiosk-based customer interaction may be conducted without the need for a credit card or other payment process present on the key cutting kiosk and without the need for any or further store involvement. The webpage presented via the QR code URL link may be configured to appear as branded or coming from or associated with the local store, e.g., Auto Zone, at which the key cutting kiosk is located or it may have branding indicia associated with the central service, e.g., Car Keys Express (CKE). In addition, other services or events may occur, e.g., the user optionally creates an account with the central service, and the user optionally opts in or opts out of saving their key to a key bank or CKE Key Vault.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A method for making duplicate keys comprising the following steps:
    presenting by a display a user interface having a first set of selectable elements configured to receive user inputs;
    identifying a make, model and year ("MMY") and/or Vehicle Identification Number ("VIN") representing a target vehicle for purposes of cutting a key blank based on a master key to operate the target vehicle;
    receiving a user input selecting a desired key blank from a set of at least one suggested key blank;
    instructing a user in a manner of presenting the master key for scanning and receiving on a scannable surface a physical master key having a keyblade;
    capturing by a vision system comprising a camera a set of images of the master key, determining a feature location of the master key, and targeting a laser and determining a set of locations of the master key keyblade;

determining by a processor a set of physical parameters of the master key keyblade;

inserting the selected key blank in a key blank holder for duplication;

cutting by a key cutting component the selected key inserted in the key blank holder based at least in part on the set of physical parameters of the master key keyblade resulting in a duplicate key;

determining by a processor whether the selected key blank requires programming to pair with the target vehicle and if the key blank requires programming, presenting a user interface configured to instruct the user in programming the duplicate key.

2. The method of claim 1 further comprising providing via a user interface a key blank identifier associated with the selected key blank and providing a set of location indicia corresponding to a defined location.

3. The method of claim 2 further comprising providing by a user interface a "Quick Reference" identifier assigned to the selected key blank and present on the selected key blank or key blank packaging for confirming correct retrieval of the selected key blank.

4. The method of claim 1 further comprising scanning a machine-readable code present on the selected key blank or key blank packaging for confirming correct retrieval of the selected key blank.

5. The method of claim 1 wherein the user interface presenting the set of at least one suggested key blank comprises a set of visual images representing the physical appearance of each of the set of at least one suggested key blank for visual comparison with the master key prior to duplication.

6. The method of claim 1 further comprising restricting an action based on an authorization step and presenting via a user interface a set of selectable elements configured to receive from the user an input corresponding to a set of authorization data to establish the user as being authorized to perform the restricted action and permitting the action upon establishing the user as authorized to perform the action.

7. The method of claim 1 further comprising selectively locking and unlocking a set of at least one door providing access to one or more of a key cutting compartment, a master key scanning compartment, and/or a key blank storage compartment.

8. The method of claim 1 further comprising determining by the vision system whether the scanned master key matches the selected key blank and upon confirmation of a match presenting the user with location data for retrieving the selected key blank.

9. The method of claim 8 wherein upon determining the scanned master key does not match the selected key blank, presenting the user with an indication of a failed match and prompting the user to confirm information pertaining to the master key.

10. The method of claim 1 wherein upon determining the selected key blank requires programming to pair with the target vehicle, determining the type of programming required from a set of programming types and, based on the determined programming type, providing the user with a set of instructions to instruct the user on a set of programming procedures required to pair the duplicate key with the target vehicle, and performing the set of programming procedures and confirming pairing of the duplicate key with the target vehicle.

11. The method of claim 1 further comprising determining, based on a set of stored OEM valid key code data, whether the master key physical parameters match a valid OEM code for the MMY input and/or other user inputs related to identifying the master key or the target vehicle.

12. The method of claim 1 wherein identifying a make, model and year ("MMY") or VIN representing a target vehicle for purposes of cutting a key blank based on a master key to operate the target vehicle further comprises iteratively presenting, based on a known set of compatible key blanks for the identified MMY or VIN, a set of user interfaces having a set of selectable elements configured to receive user inputs representing additional identifiable characteristics of the master key.

13. The method of claim 1, wherein identifying a make, model and year ("MMY") or VIN representing a target vehicle for purposes of cutting a key blank based on a master key to operate the target vehicle further comprises presenting the user with a hierarchical sequence of prompts based on a decision tree and a set of received user inputs in response to the sequence of prompts.

14. The method of claim 1 further comprising generating a key order record and generating a QR code or other reference related to the key cutting order, wherein the key order record comprises the set of images of the master key, the user inputs and the QR code or other reference.

15. The method of claim 14 further comprising extracting, by use of a mobile device, product related information from the QR code, the product related information including links to mobile app pages, URLs or webpages.

16. A kiosk-based system for making duplicate keys, the system comprising:

a processor in communication with a memory having a set of instructions executable by the processor stored therein, the set of instructions comprising a set of key cutting instructions, a set of key scanning instructions, and a set of user interface instructions;

a display adapted to present user interfaces and to receive user inputs based on user actions associated with the user interfaces;

a set of user interfaces having a set of selectable elements configured to receive user inputs identifying a make, model and year ("MMY") or Vehicle Identification Number ("VIN") representing a target vehicle for purposes of cutting a key blank based on a master key to operate the target vehicle;

a master key scanning device comprising a vision system and a scannable surface adapted to receive for scanning a physical master key having a keyblade, wherein the vision system comprises a camera and is adapted to capture a set of images of the master key, and wherein the processor executes the set of scanning instructions to determine a set of physical parameters of the master key;

a key blank selection user interface having a set of selectable elements comprising a set of at least one suggested key blank based on the MMY or VIN user inputs and, being adapted to receive a user input representing a selected key blank from the set of at least one suggested key blank;

a key cutting device adapted to receive and cut a received key blank based at least in part on the determined set of master key physical parameters to create a duplicate key;

wherein the processor is configured to access key data and execute instructions to determine whether the duplicate key requires programming to pair with the target vehicle, and, if the duplicate key requires programming, to generate a set of instructions to instruct the user in programming the duplicate key.

17. The system of claim 16 further comprising a database having stored therein a set of automotive data and a set of residential key data and further comprising a user interface having a set of selectable elements configured to receive a user input differentiating between a residential key duplication process and an automotive key duplication process.

18. The system of claim 16 further comprising a user interface configured to instruct a user in a manner of presenting the master key for scanning and instruct the user in a manner of inserting the selected key blank in a key blank holder of the key cutting device for duplication.

19. The system of claim 16 further comprising a key blank identifier associated with the selected key blank and a set of location indicia corresponding to a defined location, wherein the key blank identifier is presented via user interface.

20. The system of claim 16 further comprising a "Quick Reference" identifier assigned to the selected key blank and present on the selected key blank or key blank packaging for confirming correct retrieval of the selected key blank.

21. The system of claim 16 further wherein the key blank selection user interface comprises a set of visual images representing the physical appearance of each of the set of at least one suggested key blank for visual comparison with the master key prior to selection and duplication.

22. The system of claim 16 further comprising an authorization user interface comprising a set of selectable elements configured to receive from the user an input corresponding to a set of authorization data stored in the database to establish the user as being authorized to perform a restricted action and permitting the action upon establishing the user as authorized to perform the restricted action.

23. The system of claim 16 wherein the processor, based on operation of the vision system, determines whether the scanned master key matches the selected key blank and, upon confirmation of a match, presents the user with location data for retrieving the selected key blank from the key blank storage compartment.

24. The system of claim 16 wherein the set of user interface instructions includes a set of programming instructions executable by the processor, the system further comprising a set of programming tools, wherein the processor executes the set of programming instructions to determine the selected key blank requires programming to pair with the target vehicle, determine the type of programming required from a set of programming types and, based on the determined programming type, providing the user with a set of instructions to instruct the user on a set of programming procedures and programming tool required to pair the duplicate key with the target vehicle.

25. The system of claim 16 further comprising a set of programming tools including an OBD programming tool configured to be connected to the target vehicle OBD interface and to provide prompts to the user in connection with pairing the duplicate key with the target vehicle.

26. The system of claim 16 wherein the automotive key data stored in the database includes a set of valid OEM key code data and wherein the processor is adapted to access the stored set of valid OEM key code data, compare the valid OEM key code data with the master key physical parameters, and determine whether the master key physical parameters match a valid OEM key code for the MMY input.

27. The system of claim 16 further comprising a communications interface adapted to communicate with a central server over a communications network, whereby data and instructions may be uploaded and/or downloaded in a bi-directional manner with the central server.

28. The system of claim 16 further comprising a key blank storage compartment containing key blank products for retrieving and cutting.

29. The system of claim 28 further comprising a set of at least one door providing access to one or more of a key cutting compartment, a master key scanning compartment, and/or the key blank storage compartment for controlling access to one or more such areas, and further comprising a set of at least one locking mechanism operable by action of the processor to lock and unlock the set of at least one door.

30. The system of claim 16 further comprising a scanner adapted to scan a machine-readable code present on the selected key blank or key blank packaging for confirming correct retrieval of the selected key blank.

31. The system of claim 16 further comprising a central server in communication with the processor and memory, whereby instructions and key related data are communicated for accessing by the processor.

32. The system of claim 16, wherein the set of user interfaces having a set of selectable elements configured to receive user inputs identifying a make, model and year ("MMY") or Vehicle Identification Number ("VIN") is adapted to present the user with a hierarchical sequence of prompts based on a decision tree and a set of received user inputs in response to the sequence of prompts.

33. The system of claim 16 further comprising a reference code generator adapted to generate a QR code or other reference related to a key cutting order, the key order record comprising the set of images of the master key, the user inputs and the QR code or other reference.

34. The system of claim 33 wherein the user interface is adapted to present at the remote access device product related information extracted from the QR code, the product related information including links to mobile app pages, URLs or webpages.

* * * * *